US010812761B2

(12) United States Patent
Zhang et al.

(10) Patent No.: US 10,812,761 B2
(45) Date of Patent: Oct. 20, 2020

(54) COMPLEX HARDWARE-BASED SYSTEM FOR VIDEO SURVEILLANCE TRACKING

(71) Applicant: Tencent Technology (Shenzhen) Company Limited, Shenzhen, Guangdong (CN)

(72) Inventors: Lei Zhang, Guangdong (CN); Shipeng Zhang, Guangdong (CN); Zhijie Xie, Guangdong (CN); Chao Wan, Guangdong (CN); Xin Xu, Guangdong (CN); Chaohui Ding, Guangdong (CN); Hua Mao, Guangdong (CN); Tao Wang, Guangdong (CN); Chang Liu, Guangdong (CN); Keji Wang, Guangdong (CN); Fengli Ruan, Guangdong (CN); Huiqin Yang, Guangdong (CN); Mo Zhao, Guangdong (CN); Zijie Chen, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 169 days.

(21) Appl. No.: 15/989,540

(22) Filed: May 25, 2018

(65) Prior Publication Data
US 2018/0278892 A1 Sep. 27, 2018

Related U.S. Application Data

(63) Continuation of application No. PCT/CN2017/079498, filed on Apr. 5, 2017.

(30) Foreign Application Priority Data

May 13, 2016 (CN) .......................... 2016 1 0318941

(51) Int. Cl.
*H04N 7/18* (2006.01)
*G06K 9/00* (2006.01)
*H04N 5/14* (2006.01)

(52) U.S. Cl.
CPC ........... *H04N 7/18* (2013.01); *G06K 9/00295* (2013.01); *G06K 9/00771* (2013.01); *H04N 5/144* (2013.01); *H04N 7/188* (2013.01)

(58) Field of Classification Search
CPC .............. H04W 4/029; G06K 2209/27; G06K 9/00295; G06K 9/00335; G06K 9/00771; H04N 7/188; H04N 7/18
See application file for complete search history.

(56) References Cited

U.S. PATENT DOCUMENTS

2002/0183979 A1* 12/2002 Wildman ........... G08B 13/2417
702/188
2005/0093976 A1 5/2005 Valleriano et al.
(Continued)

FOREIGN PATENT DOCUMENTS

CN 101465033 A 6/2009
CN 101867730 A 10/2010
(Continued)

OTHER PUBLICATIONS

International Preliminary Report on Patentability dated Nov. 13, 2018 for PCT Application No. PCT/CN2017/079498 (English and Chinese languages) (4 pp.).
(Continued)

*Primary Examiner* — Peet Dhillon
(74) *Attorney, Agent, or Firm* — Brinks Gilson & Lione

(57) ABSTRACT

A tracking method for a video surveillance system includes: obtaining identification information for a first target object uploaded by a positioning system; obtaining time information and location information for the positioning system at
(Continued)

the time the positioning system uploads the identification information; storing the identification information, the location information, and the time information in a preset database to obtain a storage result; and generating tracking information for the first target object according to the storage result.

11 Claims, 17 Drawing Sheets

(56) References Cited

U.S. PATENT DOCUMENTS

| | | | | |
|---|---|---|---|---|
| 2011/0134240 | A1* | 6/2011 | Anderson | H04W 4/029 348/143 |
| 2013/0279588 | A1* | 10/2013 | Wu | H04N 19/54 375/240.16 |
| 2016/0065906 | A1* | 3/2016 | Boghossian | G06T 7/277 348/159 |
| 2018/0039837 | A1* | 2/2018 | Song | G06K 9/00335 |

FOREIGN PATENT DOCUMENTS

| | | |
|---|---|---|
| CN | 103217697 A | 7/2013 |
| CN | 103413198 A | 11/2013 |
| CN | 103472803 A | 12/2013 |
| CN | 104034316 A | 9/2014 |
| CN | 104506603 A | 4/2015 |
| CN | 104516295 A | 4/2015 |
| CN | 104660987 A | 5/2015 |
| CN | 105222774 A | 1/2016 |
| CN | 105357480 A | 2/2016 |
| CN | 105403214 A | 3/2016 |
| TW | 201509785 A | 3/2015 |

OTHER PUBLICATIONS

International Search Report and Written Opinion dated Jun. 7, 2017 for PCT Application No. PCT/CN2017/079498 (English and Chinese languages) (15 pp.).

Office Action dated Jun. 5, 2019 for Chinese Application No. 201610318941.9 with concise English Translation, 10 pages.

* cited by examiner

Surveillance image

Suspicious person A

COMPLEX HARDWARE-BASED SYSTEM FOR VIDEO SURVEILLANCE TRACKING

RELATED APPLICATION

This application claims priority to Patent Cooperation Treaty Application No. PCT/CN2017/079498, filed on Apr. 5, 2017 and entitled "TRACK OBTAINING METHOD AND APPARATUS FOR VIDEO SURVEILLANCE SYSTEM", which claims priority to Chinese Patent Application NO. 2016103189419, filed with the Chinese Patent Office on May 13, 2016 and entitled "TRACK OBTAINING METHOD AND APPARATUS FOR VIDEO SURVEILLANCE SYSTEM", both of the foregoing being incorporated herein by reference in their entirety.

FIELD OF THE TECHNOLOGY

The disclosure relates to the field of video surveillance.

BACKGROUND OF THE DISCLOSURE

Recent advance in video, computer, and network technology, driven by immense customer demand, have led to widespread adoption of video surveillance technologies for monitoring premises, status monitoring, and person of interest surveillance. As one example, the city of London in the United Kingdom has deployed nearly 500,000 closed-circuit television cameras for the tracking and security of the city's residents. Improvements in video processing technologies will further enhance the capabilities of video surveillance technologies.

SUMMARY

The present disclosure discusses techniques and architectures for video surveillance tracking. In an illustrative example, tracking may be achieved by obtaining identification information of a first target object uploaded by a positioning system, the positioning system and the first target object being located in an indoor environment, the positioning system being configured to locate the first target object in the indoor environment; obtaining time information and location information of the positioning system when the positioning system uploads the identification information; storing the identification information, the location information, and the time information in a preset database, to obtain a storage result; and generating tracking information of the first target object according to the storage result.

DESCRIPTION OF EMBODIMENTS

Figure 1:
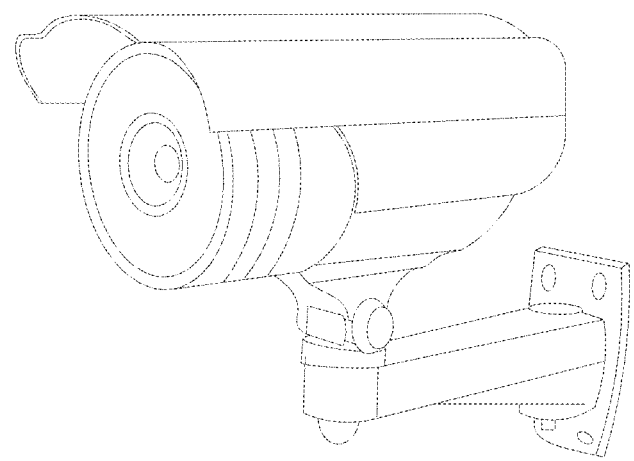
FIG. 1 is a schematic diagram of a camera.
Figure 2:
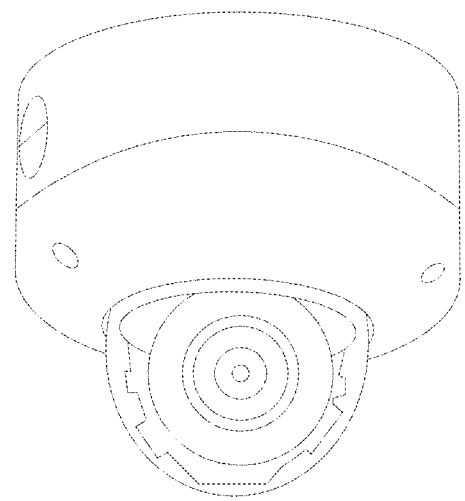
FIG. 2 is a schematic diagram of another camera.
Figure 3:
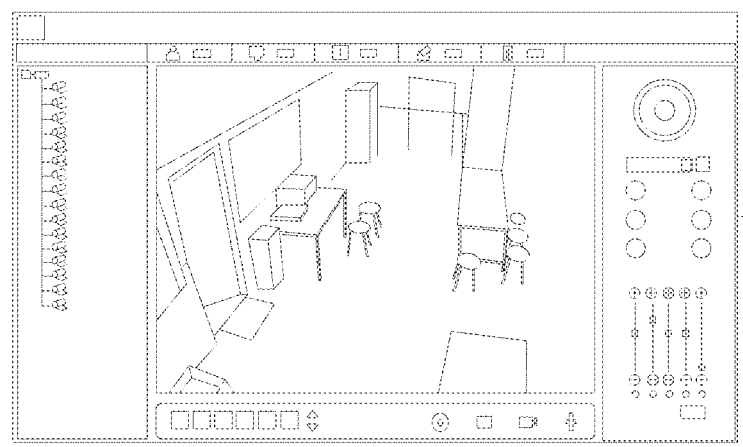
FIG. 3 is a schematic diagram of a video surveillance interface.

Video surveillance may be implemented by using a video surveillance system. A video surveillance system may include parts such as a front end camera, a transmission cable, and a video surveillance platform. FIG. 1 is a schematic diagram of a camera. As shown in FIG. 1, the camera may be disposed on a wall. FIG. 2 is a schematic diagram of another camera. As shown in FIG. 2, the camera may be suspended on a ceiling. FIG. 3 is a schematic diagram of a video surveillance interface. As shown in FIG. 3, the video surveillance interface includes sections used for monitoring a target object using the video surveillance system, for example, a surveillance image of a surveillance region, a selection list, and a function menu. Tracking may performed indoors and/or outdoors. A target object may be tracked using an image processing method. Accordingly, the video surveillance system may be widely applied in multiple environments with differing information characteristics, e.g., accuracy, timeliness, and content richness.

Video surveillance systems may use a smartphone as a surveillance display device, perform simple recognitions, store surveillance images, and may automatically provide an alarm. In example scenarios, surveillance personnel may view a surveillance image in real time, playback a historical surveillance images, and invoke and store a surveillance images. Accordingly, surveillance personnel may control the location of the surveillance in real-time, include emergency scenarios.

In some cases, after an emergency develops, surveillance personnel can analyze an antecedent and consequence of the event using a video, and implement tracking on a target object of interest. In some cases, for a suspicious target object, first, surveillance personnel may need to search and determine the suspicious target object using images from the video surveillance system. The surveillance personnel may then follow the suspicious target object in surveillance videos along a route by tracking recognizable features such as the face, clothing, and/or vehicle of the suspicious target object. The surveillance personnel may connects points to generate a path along which suspicious target object moves thereby narrowing the field of investigation for personnel in other investigatory roles.

The described embodiments are merely some but not all of the embodiments of the technologies and architectures discussed.

In the specification, claims, and accompanying drawings of the present disclosure, the terms "first", "second", and the like are intended to distinguish between similar objects rather than describe a specific order or sequence. It should be understood that, data used in this way is exchangeable in a proper case, so that the architectures and techniques described herein can be implemented in another order except those shown or described herein. In addition, the terms "include", "have" and any other variants mean to cover the non-exclusive inclusion, for example, a process, method, system, product, or device that includes a series of steps or units is not necessarily limited to clearly listing those steps or units, but may include other steps or units not expressly listed or inherent to such a process, method, product, or device.

Example Embodiment 1

The steps shown in the flowcharts of the accompanying drawings may be performed using a computer system such as a group of computer-executable instructions. In addition, although an example logical order is shown in the flowcharts, in some cases, the step shown or described may be performed in an order different from the order herein.

Figure 4:
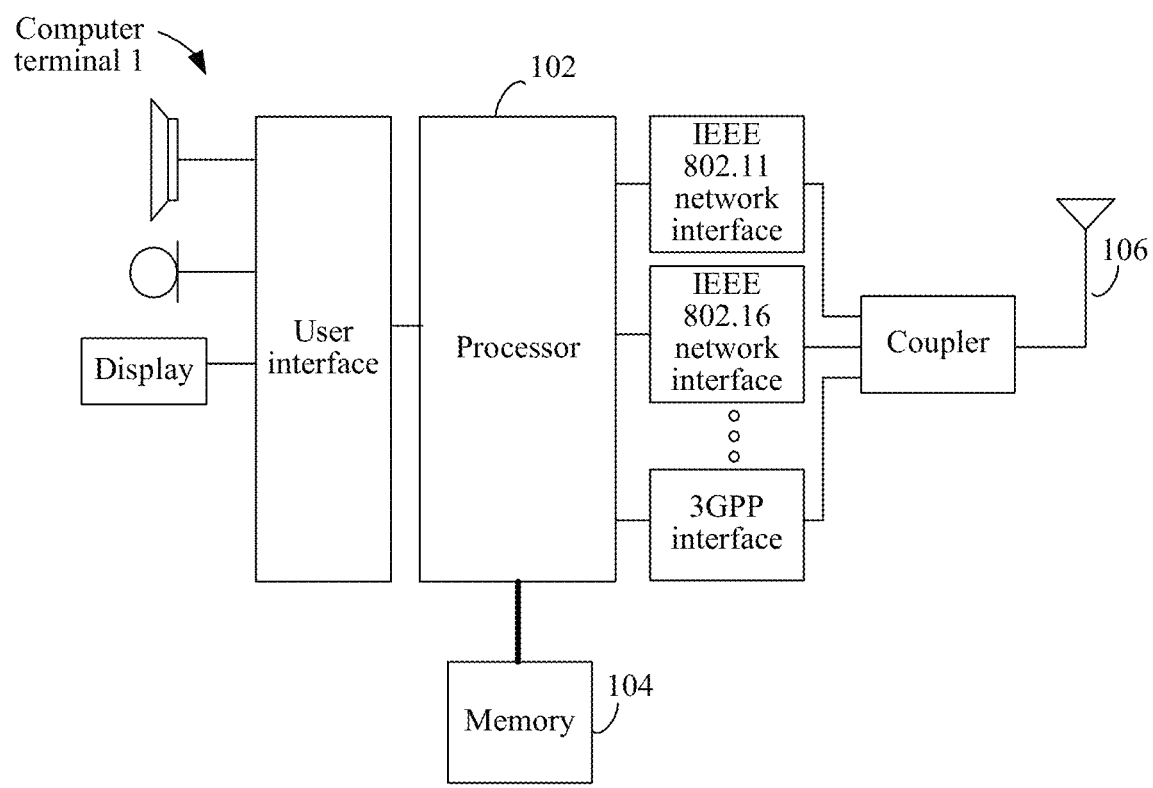
FIG. 4 is a structural block diagram of computer terminal for execution of a tracking method for a video surveillance system.

The method of example embodiment 1 of this application may be performed in a mobile terminal, a computer terminal, or a similar operation apparatus. FIG. 4 is a structural block diagram of computer terminal for execution of a tracking method for a video surveillance system. As shown in FIG. 4, the computer terminal 1 may include one or more processors 102 (which may include, but are not limited to, a processing apparatus, for example, a microprocessor MCU or a field programmable gate array FPGA), a memory 104 configured to store data, and a transmission apparatus 106 for a communication. It may be understood by a person of ordinary skill in the art that the structure shown in FIG. 4 is an illustrative example. For example, the computer terminal 1 may also include more or fewer components than those shown in FIG. 4, or have a configuration different from that shown in FIG. 4.

The memory 104 may be configured to store a software program and a module of application software, for example, a program instruction/module one or more tracking methods described below. The processor 102 executes various function applications and data processing by running the software program and the module stored in the memory 104. The memory 104 may include a high-speed random memory, and may also include a nonvolatile memory such as one or more magnetic storage devices, a flash memory, or another nonvolatile solid-state memory. In some examples, the memory 104 may further include a memory that is remotely disposed relative to the processor 102, and the remote memory may be connected to the computer terminal 1 through a network. Examples of the network include, but are not limited to, the Internet, an intranet, a local area network, a mobile communications network, and a combination thereof.

The transmission apparatus 106 is configured to receive or send data through a network. A specific example of the network may include a radio network provided by a communications provider of the computer terminal 1. In an example, the transmission apparatus 106 includes a network interface controller (NIC) that may be connected to another network device by using a base station, thereby communicating with the Internet. In an example, the transmission apparatus 106 may be a radio frequency (RF) module that is configured to communicate with the Internet in a wireless manner.

Figure 5:
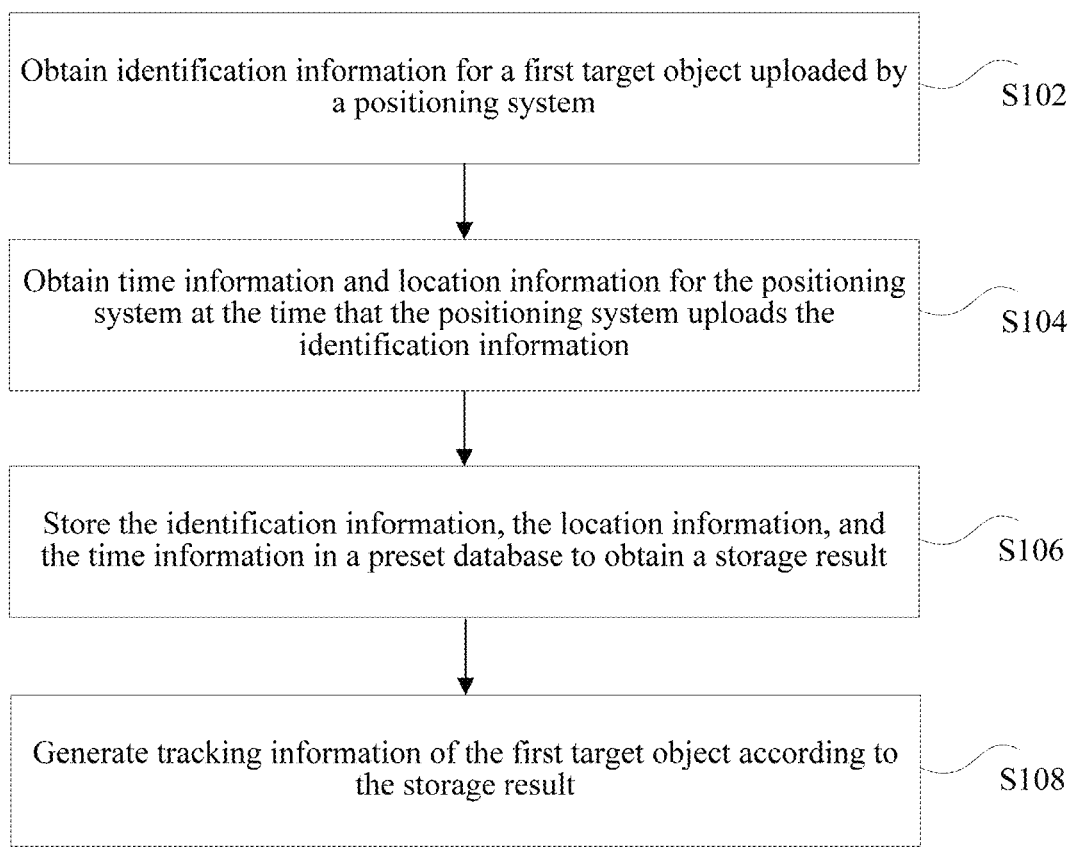
FIG. 5 is a flowchart of a first example tracking method for a video surveillance system.

In the foregoing running environment, this application provides a tracking method for a video surveillance system shown in FIG. 5. The method may be applied to an intelligent terminal device to be performed by a processor in the intelligent terminal device. The intelligent terminal device may be a smartphone, a tablet computer, or the like. At least one application program is installed in the intelligent terminal device. The application program may be a system application program, a software application program, or virtually any type of computer program.

FIG. 5 is a flowchart of an example tracking method for a video surveillance system.

Step S102: Obtain identification information of a first target object uploaded by a positioning system.

In the solution provided by step S102, the identification information of the first target object uploaded by the positioning system is obtained, the positioning system and the first target object being located in an indoor environment, the positioning system being configured to locate the first target object in the indoor environment, and the first target object being a to-be-tracked object.

The positioning system may be a positioning system that implements positioning by using multiple technologies, for example, wireless communication, base station positioning, and inertial navigation positioning. The positioning system may be distributed across various locations in a building and locates the first target object when the first target object is located at different places of the building. The first target object is the to-be-tracked object, and may be a target person, a target substance, or other target of interest. The first target object is located by using the positioning system in the indoor environment. The identification information of the first target object is used to identify the first target object. The identification information may be information that is particularized to the target, such as unique or uncommon features, visible identification codes, or other distinguishing features. The identification information may include information about a positioning probe corresponding to the first target object, that is, the information about the positioning probe. In the positioning system, the positioning probe may be a marker that monitors the first target object and is in a one-to-one correspondence with identity information of the first target object. The positioning probe may be worn by the target. For example, the positioning probe is distributed to a visitor in a form of a visitor card, so that the positioning probe is bound with the visitor holding the positioning probe. For an employee in the building, the positioning probe may be embedded in a work card of the employee.

The positioning system detects whether the first target object exists in the indoor environment by collecting the information about the positioning probe of the positioning probe. When the positioning system detects the information about the positioning probe, the first target object is determined to be detected in the indoor environment, and the identification information of the first target object is uploaded. For example, the information about the positioning probe of the positioning probe corresponding to the first target object is uploaded, to obtain the identification information of the first target object uploaded by the positioning system.

Step S104: Obtain time information and location information of the positioning system when the positioning system uploads the identification information.

In the solution of this application provided by step S104, the time information is the time when the positioning system uploads the identification information of the first target object. The location information of the positioning system is a location of an indoor environment in which the positioning system is currently located. That is, the first target object is located in a preset distance range of the positioning system, and a location at which the first target object is located is indicated by using the location information of the positioning system. After the identification information of the first target object uploaded by the positioning system is obtained, the time information and location information of the positioning system when the positioning system uploads the identification information are obtained. For example, when the positioning system is a base station, when uploading the identification information of the first target object, the base station simultaneously uploads the location information and the time information of the base station when the base station uploads the first target object to a server. Accordingly, the server obtains the time information and the location information of the base station when the base station uploads the identification information.

Step S106: Store the identification information, the location information, and the time information in a preset database, to obtain a storage result.

In the solution provided by step S106, after the time information and the location information of the positioning system when the positioning system uploads the identification information are obtained, the identification information, the location information, and the time information are combined and stored in the preset database to obtain the storage result. The preset database may be a personnel tracking database. The storage result is stored in a one-to-one correspondence with the location at which the first target object is located and a time of the location. The identification information of the storage result may be information about a positioning probe corresponding to the first target object. The location information is location information of the positioning system that correspondingly locates the first target object.

Step S108: Generate tracking information of the first target object according to the storage result.

In the solution of this application provided by step S108, the tracking information of the first target object is generated according to the storage result. Optionally, the tracking information of the first target object is generated according to the storage result and a historical storage result. Before the storage result is obtained, the identification information of the first target object is uploaded by a positioning system in another indoor environment, and the historical storage result is a result obtained by storing time information and location information of the positioning system in another indoor environment when the positioning system in another indoor environment uploads the identification information. Before being located in a preset distance range of the current positioning system, the first target object is located by using the positioning system in another indoor environment. In addition, the positioning system this second indoor environment uploads the identification information of the first target object, the location information, and the time information. The identification information, location information and timing information are bound and stored in the preset database.

When the first target object is previously located in another indoor environment, the storage result in the preset database is the historical storage result. When the first target object is transferred from a current indoor environment to another indoor environment, the storage result in the preset database is the historical storage result.

Optionally, the tracking information of the first target object is generated according to the storage result and the historical storage result in the preset database. The location information in the storage result of the first target object may be integrated, to generate all tracked routes of the first target object, to obtain the tracking information for the first target object. Multiple positioning systems may be disposed in the indoor environments, and when different first target objects are located in different indoor environments, the multiple positioning systems may collect identification information on the different first target objects. This information be then uploaded to a server. With reference to the identification information, the location information, and the time information, the server stores the information in the preset database to generate tracking information of the different first target objects. The tracking information of the first target object does not need to be reviewed by a surveillance person in video surveillance images.

The positioning system and the first target object being located in the indoor environment, the positioning system being configured to locate the first target object in the indoor environment, and the first target object being a to-be-tracked object; obtaining the time information and the location information of the positioning system when the positioning system uploads the identification information; storing the identification information, the location information, and the time information in the preset database, to obtain the storage result; and generating the tracking information of the first target object according to the storage result, thereby resolving the technical problem that the labor costs of obtaining a track of a target object are high in the related technology.

Optionally, after the tracking information of the first target object is generated according to the storage result, video images of a surveillance region that correspond to the tracking information may be invoked from a video surveillance system according to the time information and the location information, and track image information of the first target object is obtained according to the video images of the surveillance region that correspond to the tracking information.

Figure 6:
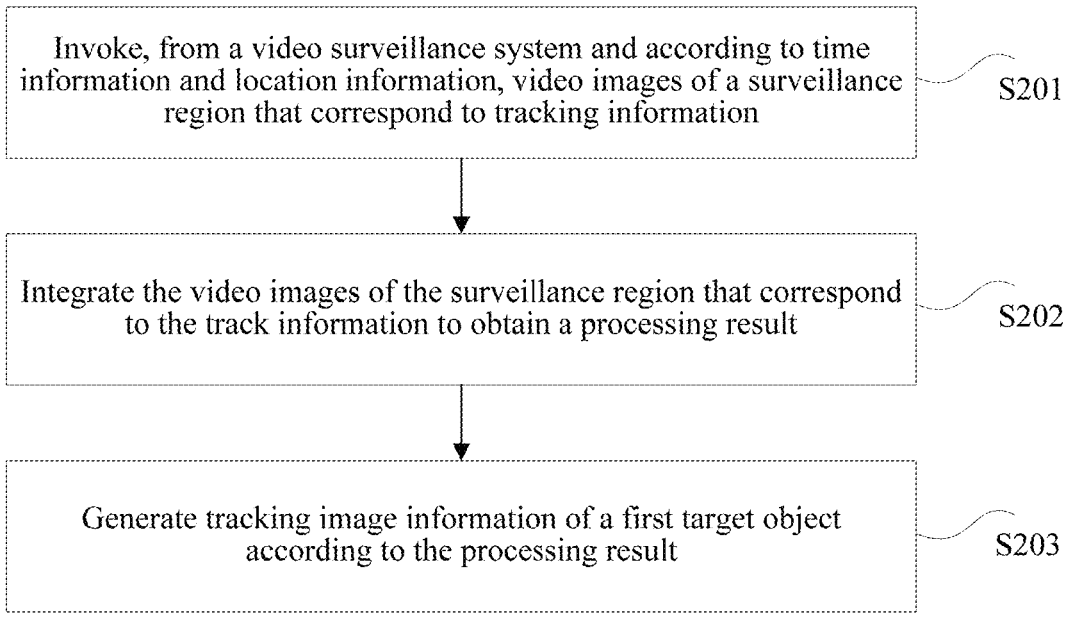
FIG. 6 is a flowchart of a second example tracking method for a video surveillance system.

FIG. 6 is a flowchart of a second example tracking method for a video surveillance system. As shown in FIG. 6, the tracking method for a video surveillance system includes the following steps.

Step S201: Invoke, from a video surveillance system according to time information and location information, video images of a surveillance region that correspond to tracking information.

In the solution provided by step S201, when a first target object is located in the surveillance region, the video surveillance system monitors the first target object. The video surveillance system may monitor the first target object by using a front-end surveillance device, to obtain video images of the first target object in the surveillance region and store the video images in the video surveillance system. The location information and time information of a positioning system when the positioning system uploads identification information of the first target object correspond to the video images of the first target object. That is, the video images of the surveillance region in which the first target object is located may be invoked from the video surveillance system by using the location information and the time information of the positioning system when the positioning system uploads the identification information of the first target object.

After the tracking information for the first target object is generated according to a storage result, the tracking information of the first target object may be stored in the video surveillance system. The location information may be location information for the positioning system when the first target object is located in different indoor environments. The time information may be the time when the positioning system uploads the identification information when the first target object is located in different indoor environments. The video images in the video surveillance system are video images of the first target object in different indoor environments. The video images of the surveillance region that correspond to the tracking information of the first target object are determined in the video surveillance system according to the location information and the time information of the positioning system when the positioning system uploads the identification information of the first target object in different indoor environments.

Step S202: Integrate the video images of the surveillance region that correspond to the tracking information, to obtain a processing result.

In the solution provided by step S202, after the video images of the surveillance region that correspond to the tracking information are invoked from the video surveillance system according to the time information and the location information, the video images of the surveillance region that correspond to the tracking information are integrated to obtain the processing result. The video images of the surveillance region that correspond to the tracking information of a first target object in different indoor environments may be integrated to obtain the processing result.

Step S203: Generate track image information of a first target object according to the processing result.

In the solution provided by step S203, after the video images of the surveillance region that correspond to the tracking information are integrated to obtain the processing result, the tracking image information for the first target object is generated according to the processing result. The first target object may be a person in a building. Tracking image information of any person in the building is generated by using a positioning system distributed at different locations in the building. Thus, the system may increase convenience for surveillance personnel monitoring people in the building in real time.

In this example embodiment, the video images of the surveillance region that correspond to the tracking information are invoked from the video surveillance system according to the time information and the location information. The video images of the surveillance region that correspond to the tracking information are integrated to obtain the processing result. The tracking image information of the first target object is generated according to the processing result.

In an optional implementation, the first target object may include multiple first target objects located in the surveillance region, and a preset database that stores tracking image information of the multiple first target objects. After the tracking information for the first target object is generated according to the storage result, a second target object is determined in the multiple first target objects. Then, the system may perform matching separately between physical feature parameters of the multiple first target objects and physical feature parameters of the second target object according to a preset rule, to obtain a matching result. Tracking image information for the second target object may be determined according to the matching result.

Figure 7:
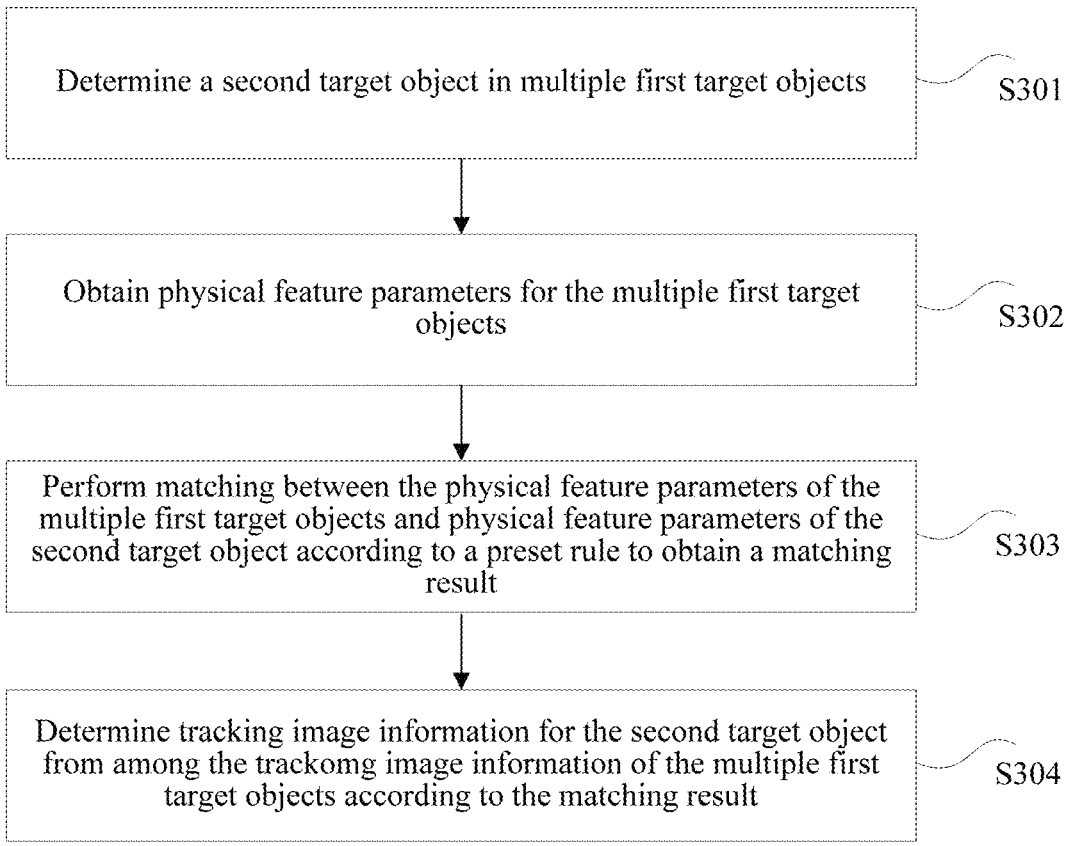
FIG. 7 is a flowchart of a third example tracking method for a video surveillance system.

FIG. 7 is a flowchart of a third example tracking method for a video surveillance system.

Step S301: Determine a second target object from the multiple first target objects.

In the solution provided by step S301, the second target object is determined from among the multiple first target objects, and the second target object is marked using a preset symbol. The preset symbol may be a symbol used for marking the second target object, for example, a circle and a block. In the video surveillance system, multiple first target objects are present in a surveillance region. The multiple first target objects are to-be-monitored objects. The multiple first target objects correspond to multiple pieces of identification information, and the multiple pieces of identification information are uploaded to a server by a positioning system. Tracking information for the multiple first target objects are separately generated according to the identification information of the multiple first target objects and location information and time information of the positioning system when the positioning system uploads the multiple first target objects, so as to generate the tracking image information of the multiple first target objects.

After the tracking image information for the multiple first target objects is generated, the second target object is determined in the multiple first target objects. For example, the second target object, in the multiple first target objects, may a suspicious object for a particular event. Once select, the second object is marked using the preset symbol. Optionally, surveillance personnel subjectively determine the second target object and marks the second target object using a circle symbol. This may allow the video surveillance system to determine the second target object.

Step S302: Obtain physical feature parameters for the multiple first target objects.

In the solution provided by step S302, after the second target object is determined, the video surveillance system may interface with a positioning system to record identification information for the first target objects in a surveillance region that includes the second target object. Tracking image information that corresponds to the identification information may invoked based on the identification information for the first target objects. Image recognition may be performed on the track image information of the multiple first target objects based on identification information of the multiple first target objects to obtain image recognition data. The image recognition data may be used to obtain the physical feature parameters of the multiple first target objects. The physical feature parameters may be multiple parameters may be used for indicating physical features, for example, a figure parameter, a clothing parameter, and a face parameter. Image recognition routines may be applied to recognize targets and objects of various different modes. In this example embodiment, image recognition may be used to recognize parameters, for example, physical features, of a target person and a target substance in a video image.

Step S303: Perform matching between the physical feature parameters of the multiple first target objects and physical feature parameters of the second target object according to a preset rule to obtain a matching result.

In the solution provided by step S303, after the physical feature parameters of the multiple first target objects are obtained, matching may be performed between the physical feature parameters of the multiple first target objects and the physical feature parameters of the second target object according to the preset rule to obtain the matching result. The preset matching rule is an algorithm that matches the physical feature parameters of the multiple first target objects and the physical feature parameters of the second target object.

Step S304: Determine tracking image information of the second target according to the matching result.

In the solution provided by step S304, after the physical feature parameters of the multiple first target objects are matched with the physical feature parameters of the second target object, the tracking image information of the second target object is determined according to the matching result.

In an example scenario, when a suspicious person is found among in multiple people in a surveillance image, surveillance personnel may mark the suspicious person. The video surveillance system may interface with an indoor positioning system to record identification information for the region in which the suspicious object is located. A server may perform image recognition on the surveillance image in which the suspicious person is located to obtain physical feature parameters of the suspicious person. After obtaining the physical feature parameters of the suspicious person, the server invokes tracking image information for the multiple people. The system may perform image recognition on a tracking image associated with the tracking image information to obtain physical feature parameters of the multiple people. Matching is performed between the physical feature parameters of the multiple people and the physical feature parameters of the suspicious person to obtain a matching result. The tracking image information of the second target object is determined in the track image information of the multiple first target objects according to the matching result. The matching result may be provided for subsequent investigative analysis.

In an example scenario, the second target object may be determined from among the multiple first target objects, where the second target object is an object that is marked by using the preset symbol. The physical feature parameters of the multiple first target objects are obtained, Matching is may be performed between the physical feature parameters of the multiple first target objects and the physical feature parameters of the second target object according to the preset rule to obtain the matching result. The tracking image information of the second target object is determined using the tracking image information of the multiple first target objects according to the matching result.

In an optional implementation, the tracking image information of the multiple first target objects is invoked according to the identification information of the multiple first target objects. Image recognition is performed on key frames in the tracking image information of the multiple first target objects by using an image recognition system to obtain the physical feature parameters of the multiple first target objects.

Figure 8:
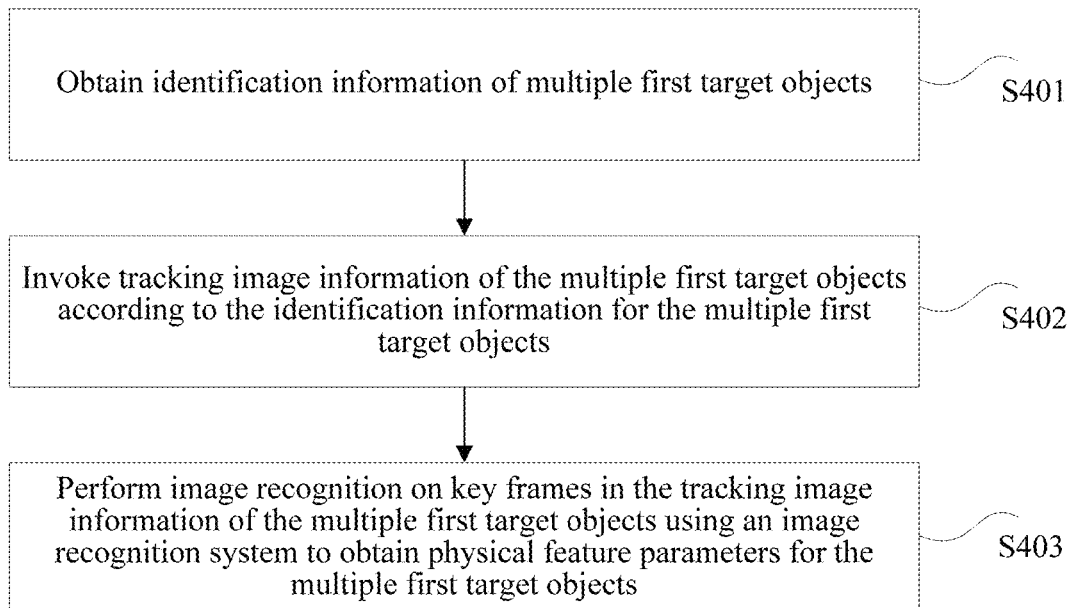
FIG. 8 is a flowchart of an example method for obtaining physical feature parameters of multiple first target objects.

FIG. 8 is a flowchart of a method for obtaining physical feature parameters of multiple first target objects Step S401: Obtain identification information for multiple first target objects.

In the solution provided by step S401, the identification information of the multiple first target objects is obtained. The identification information may be information from a positioning probe disposed on the first target object. The information from the positioning probe matches personal information of the first target object. The information about the positioning probe and the personal information of the first target object may be in a one-to-one correspondence. After a second target object is determined in the multiple first target objects, a video surveillance system interfaces with an indoor positioning system to record identification information for the first target objects in the surveillance region in which the second target object is located. The identification information is uploaded to a server to obtain the identification information of the multiple first target objects.

Step S402: Invoke track image information for the multiple first target objects according to the identification information of the multiple first target objects.

In the solution provided by step S402, the tracking image information of the multiple first target objects is stored in a preset database. After the identification information of the multiple first target objects is obtained, the tracking image information for the multiple first target objects is invoked according to the identification information of the multiple first target objects.

Step S403: Perform image recognition on key frames of the tracking image information of the multiple first target objects using an image recognition system to obtain physical feature parameters of the multiple first target objects.

In the solution provided by step S403, after the track image information of the multiple first target objects is invoked according to identification information of the multiple first target objects, image recognition may be performed on the key frames of the tracking image information for the multiple first target objects using the image recognition system. This invocation may allow the system to obtain the physical feature parameters for the multiple first target objects. The key frames are frames having key content that is representative of image content of the tracking information. For example, a high recognition output may be obtained by performing image recognition on the key frames. When the physical feature parameters of the multiple first target objects are obtained, the physical feature parameters of the multiple first target objects may be stored in a feature recognition library. In some cases, the feature parameters may be stored separately (e.g., so the feature parameters may individually be accessed). The feature recognition library is a database that is used for storing the physical feature parameters, For example, the recognition library may include a human feature recognition library established after image recognition is performed on a human in an image. Parameters in the human feature recognition library may include a series of recognition data representing human physical features, for example, face recognition data, figure recognition data, clothing recognition data, or other recognition data.

In an example, the identification information for the multiple first target objects are obtained. The track image information of the multiple first target objects are invoked according to the identification information of the multiple first target objects. Image recognition is performed on key frames in the tracking image information of the multiple first target objects using the image recognition system to obtain the physical feature parameters of the multiple first target objects. The physical feature parameters of the multiple first target objects are stored in a feature recognition library. The feature recognition library is used for storing physical feature data of the multiple first target objects.

In an optional implementation, before matching is performed between the physical feature parameters of the multiple first target objects and the physical feature parameters of the second target object according to the preset rule to obtain the matching result, the physical feature parameters of the second target object are obtained and are stored in the feature recognition library.

Figure 9:
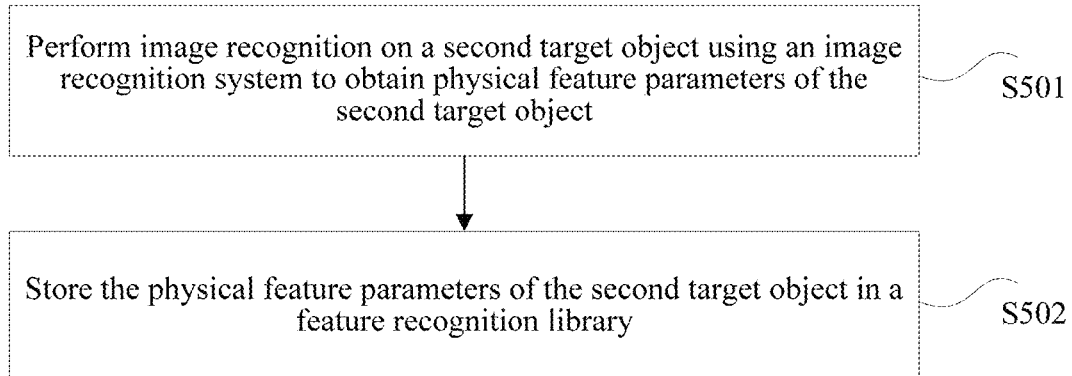
FIG. 9 is a flowchart of a fourth example tracking method for a video surveillance system.

FIG. 9 is a flowchart of a fourth tracking method for a video surveillance system.

Step S501: Perform image recognition on a second target object using an image recognition system to obtain physical feature parameters of the second target object.

In the solution provided by step S501, the second target object is distinguished from among multiple first target objects using a preset symbol, and may be a suspicious object tracked by an investigator. Before matching is performed between physical feature parameters of the multiple first target objects and the physical feature parameters of the second target object, image recognition is performed on the second target object using the image recognition system to obtain the physical feature parameters of the second target object. A server may perform image recognition on a surveillance image where the second target object in the video surveillance system is marked to obtain the physical feature parameters of the second target object. The physical feature parameters of the second target object may be recognition parameters of attributes used for representing the second target object, for example, a figure parameter, a clothing parameter, and/or a face recognition parameter of the second target object.

Step S502: Store the physical feature parameters of the second target object in a feature recognition library.

In the solution provided by step S502, after image recognition is performed on the second target object using the image recognition system to obtain the physical feature parameters of the second target object. The physical feature parameters of the second target object are stored in the feature recognition library. Therefore, the feature recognition library stores physical feature parameters of a first target object and the physical feature parameters of the second target object.

In an example, image recognition is performed on the second target object using the image recognition system to obtain the physical feature parameters of the second target object. The physical feature parameters of the second target object are stored in the feature recognition library.

In an optional implementation, matching is performed between physical feature parameters of the multiple first target objects and the physical feature parameters of the second target object according to a preset rule to obtain multiple matching degrees. The multiple matching degrees are sorted in a preset order. Key frames of the multiple first target objects are presented in the preset order by using the video surveillance system. This process may be sued to perform matching between the physical feature parameters of the multiple first target objects and the physical feature parameters of the second target object according to the preset rule.

Figure 10:
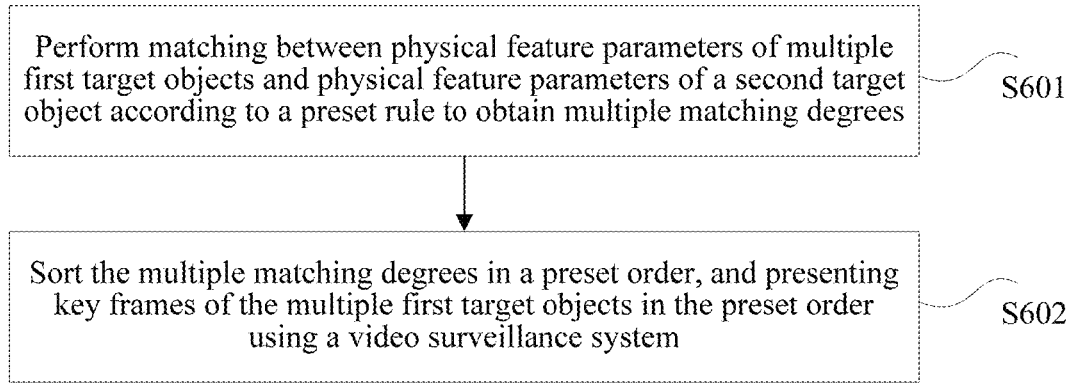
FIG. 10 is a flowchart of an example method for separately performing matching between physical feature parameters of multiple first target objects and physical feature parameters of a second target object according to a preset rule.

FIG. 10 is a flowchart of a method for performing matching between physical feature parameters of multiple first target objects and physical feature parameters of a second target object according to a preset rule.

Step S601: Perform matching between the physical feature parameters of the multiple first target objects and the physical feature parameters of the second target object according to the preset rule to obtain multiple matching degrees.

In the solution provided by step S601, after the physical feature parameters of the multiple first target objects and the physical feature parameters of the second target object are obtained, matching is performed between the physical feature parameters of the multiple first target objects and the physical feature parameters of the second target object according to the preset rule to obtain the multiple matching degrees. For example, the system may use N first target objects, e.g., $P_1$, $P_2$, $P_3$, . . . , and $P_N$. Example physical feature parameters of $P_1$ are a figure recognition parameter $X_{P1}$, a clothing recognition parameter $Y_{P1}$, and a face recognition parameter $Z_{P1}$, and/or other parameters. Matching is performed between physical feature parameters of the N first target objects and the physical feature parameters of the second target object A, A matching degree between $P_1$ and the second target object may be obtained by calculating $M_{P1}=F(X_{P1}, X)+G(Y_{P1}, Y)+K(Z_{P1}, Z)$. The process may be repeated for the remaining N−1 objects. To obtain matching degrees between the multiple first target objects and the second target object, for example, a matching degree $M_{P2}$ between $P_2$ and the second target object, and a matching degree $M_{P3}$ between $P_3$ and the second target object.

The physical feature parameters in this embodiment may include the figure recognition parameter, the clothing recognition parameter, the face recognition parameter, and/or other parameters that may be captured in image frames.

Step S602: Sort the multiple matching degrees in a preset order. Present key frames of the multiple first target objects in the preset order by using a video surveillance system.

In the solution provided by step S602, after matching is separately performed between the physical feature parameters of the multiple first target objects and the physical feature parameters of the second target object, the multiple matching degrees are sorted in the preset order. For example, $M_{P1}$, $M_{P2}$, and $M_{P3}$ are sorted in descending order. The key frames of the corresponding multiple first target objects are presented one by one in descending order in a video management interface of the video surveillance system. Via the management interface, surveillance personnel may further confirm that the second target object is marked using a preset symbol in the multiple first target objects. The tracking image information of a first target object whose matching degree with the second target object is the highest is determined as track image information of the second target object may be selected.

Optionally, after the surveillance personnel further determines the second target object, a server may mark information for the second target object. For example, when the second target object is a suspicious object for a particular event, the server may mark the second target object as a "suspect", a "criminal", or using other labels indicating marked status, and record the second target object. If the suspicious object needs to be investigated subsequently, tracking images of the suspicious object may be obtained from the server, to be provided to the investigator.

Optionally, the tracking of tracking images of the second target object may be performed by artificial intelligence. The surveillance person does not necessarily require manual confirmation of the second target object in the multiple first target objects.

In an example, matching is performed between the physical feature parameters of the multiple first target objects and the physical feature parameters of the second target object according to the preset rule to obtain the multiple matching degrees. The multiple matching degrees are sorted in to a preset order. The key frames of the multiple first target objects are presented in the preset order using the video surveillance system. The output may be provided to the surveillance personnel to further determine the track image information for the second target object.

In an optional implementation, before the second target object is determined from among multiple first target objects, the multiple first target objects are determined to be in surveillance region of a video surveillance system.

Figure 11:
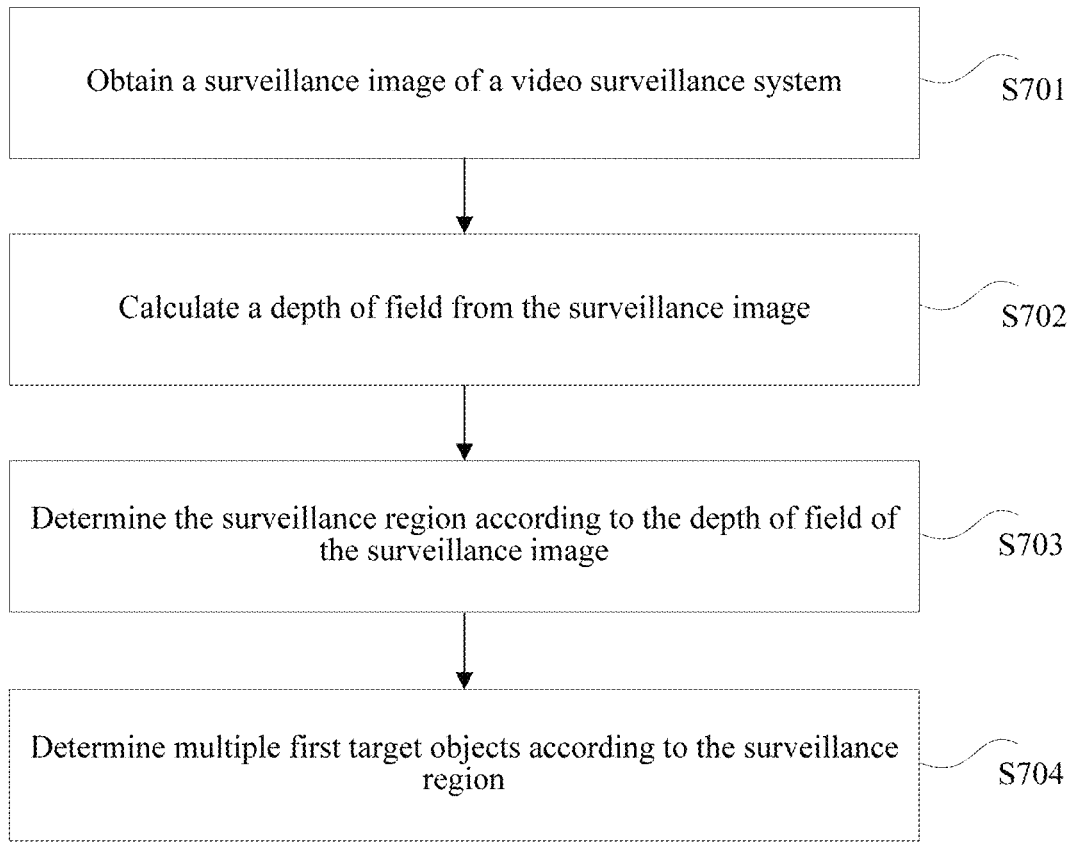
FIG. 11 is a flowchart of a fifth example tracking method for a video surveillance system.

FIG. 11 is a flowchart of a fifth example tracking method for a video surveillance system.

Step S701: Obtain a surveillance image from the video surveillance system.

In the solution provided by step S701, the video surveillance system monitors a surveillance region in which a second target object is located to obtain the surveillance image from the video surveillance system.

Step S702: Calculate a depth of field for the surveillance image.

In the solution provided by step S702, after the surveillance image of the video surveillance system is obtained, the depth of field of the surveillance image is calculated.

Step S703: Determine the surveillance region according to the depth of field of the surveillance image.

In the solution provided by step S703, a surveillance region in which a second target object is located is determined according to the depth of field of the surveillance image to obtain the surveillance region.

Step S704: Determine multiple first target objects according to the surveillance region.

In the solution provided by step S704, after the surveillance region is determined according to the depth of field of the surveillance image, a positioning system to which a second target object belongs may be determined, and the number of the first target objects that the second target object needs to match is reduced. This process may have the technical effect of increasing tracking accuracy. Accordingly, the techniques and architectures discussed may improve the operation of the underlying surveillance capture and processing hardware.

In an example, the surveillance image of the video surveillance system is obtained. The depth of field of the surveillance image is calculated. The surveillance region is determined according to the depth of field of the surveillance image, and the multiple first target objects are determined according to the surveillance region.

In an optional implementation, calculating the depth of field of the surveillance image may include: calculating the depth of field of the surveillance image using a smart camera having an infrared ranging function, Determining the surveillance region according to the depth of field of the surveillance image may include: determining the surveillance region according to the depth of field of the surveillance image using the smart camera.

In an example, a front end camera surveillance device is may be implemented using a smart camera having an infrared ranging function. When the surveillance personnel mark the second target object in the surveillance image, the smart camera may calculate a space region in which the second target object is located according to a depth of field of the second target object. Accordingly, the system may determine a positioning collecting base station to which the second target object belongs. In addition, the number of the first target objects that need to match the second target object is reduced, which may have the technical effect of increasing the accuracy of positioning and tracking for the second target object. For example, the smart camera is a QQ smart camera, and the surveillance personnel mark the second target object. A surveillance region in which the second target object is located may be automatically recognized as a data collecting region. In this case, a server may match and recognize recognition information for the first target object collected by the positioning system at the current time. For example, the server may match and recognize information about a positioning probe of the first target object collected by the positioning system at the current time.

In an optional implementation, information about a positioning probe disposed on the first target object is obtained. Personal information of the first target object is determined in information database according to the information about the positioning probe to obtain identification information of the first target object uploaded by a positioning system.

In an example scenario, the first target object is a positioning probe. The positioning system is a positioning base station disposed in an indoor environment. The positioning base station is configured to locate the positioning probe. The first target object may alternatively be a to-be-located object carrying the positioning probe. For example, the first target object is an officer. The positioning probe may be embedded in a work card of the officer. The first target object may be a visitor. The positioning probe may be embedded in a visitor card of the visitor.

Figure 12:
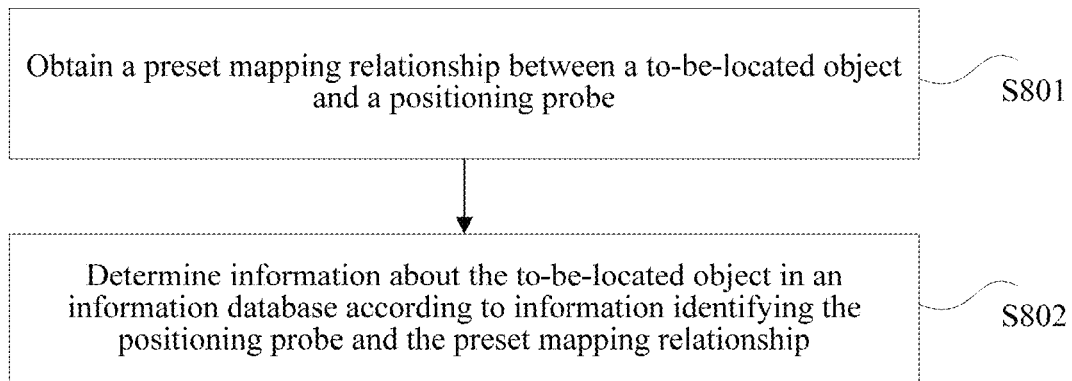
FIG. 12 is a flowchart of a sixth example tracking method for a video surveillance system.
Figure 13:
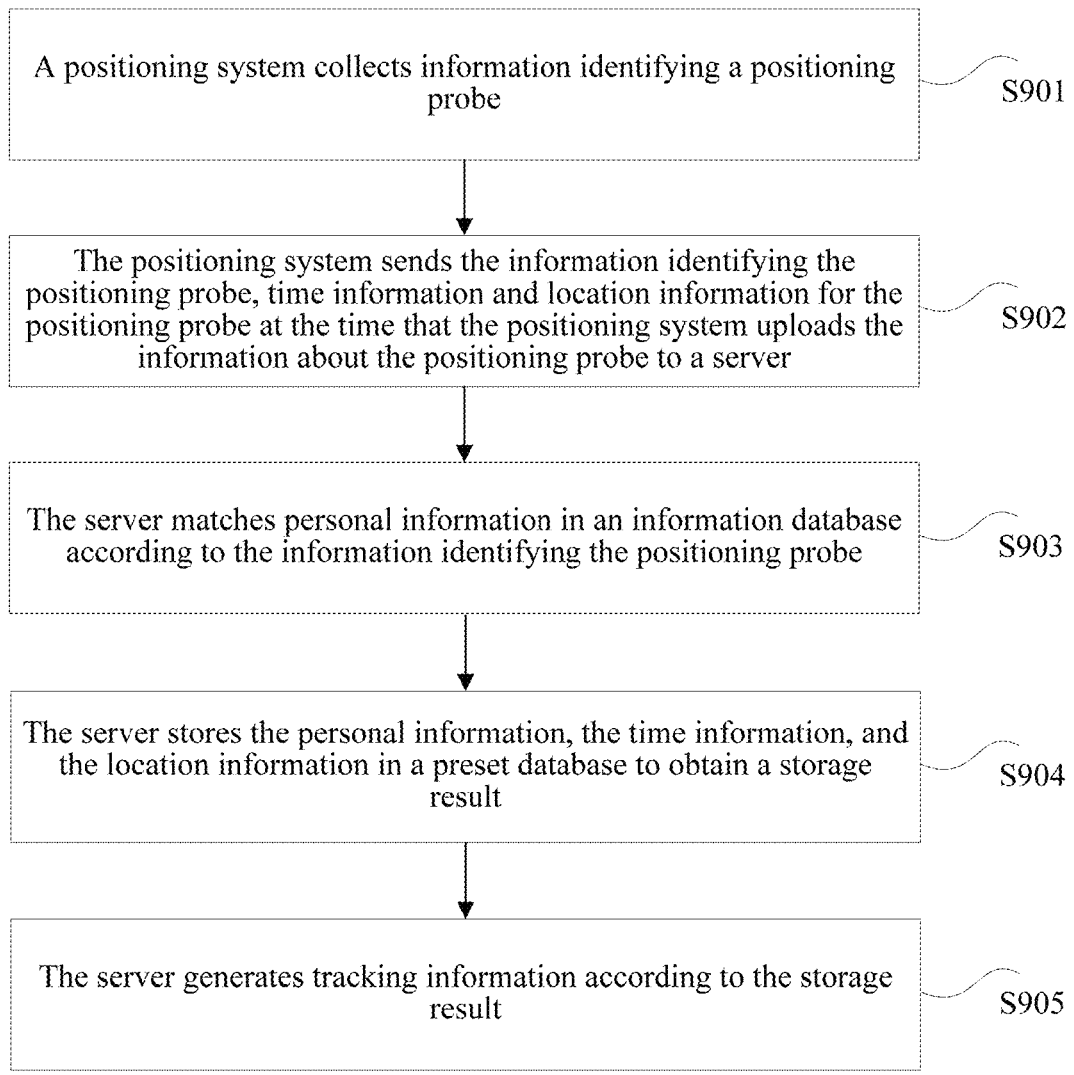
FIG. 13 is a flowchart of a seventh example tracking method for a video surveillance system.

FIG. 12 is a flowchart of a sixth example tracking method for a video surveillance system Step S801: Obtain a preset mapping relationship between a to-be-located object and a positioning probe.

In the solution provided by step S801, the preset mapping relationship between the to-be-located object and the positioning probe is obtained. The positioning probe is disposed on the to-be-located object. The positioning probe is used to mark a target object.

Optionally, the to-be-located object is a first target object. The positioning probe is disposed on the first target object. The positioning probe is used to mark the target object. In some implementations, the probe and may be distributed to a visitor in a form of a visitor card. Personal information of the visitor may be registered when the visitor card is distributed. For an employee in a building, the positioning probe may be embedded in a work card of the employee to facilitate tracking of the employee. When the employee works indoors (e.g., within the surveilled building) in for an extended duration (e.g., 15 minutes, an hour, a workday, one or more months, or other extended period), identification of a mobile terminal device such as a mobile phone of the employee may be collected. The mobile terminal of the employee is used as the positioning probe for the employee.

Step S802: Determine information about the to-be-located object using an information database and based on information about the positioning probe and the preset mapping relationship.

In the solution provided by step S802, the information database stores information particular to a first target object. Optionally, the target object may ye an employee in a building, and the information may include personal information such as the name, date of birth, a contact manner, address, or other personalized information particular to the employee. A preset mapping relationship exists between the information about the positioning probe and the personal information of the first target object in the information database. After the information about the positioning probe disposed on the first target object is obtained to obtain the information about the positioning probe, the personal information of the first target object may accessed in the information database by referencing the information regarding the positioning probe.

In an example, the preset mapping relationship between the to-be-located object and the positioning probe is obtained by obtaining the preset mapping relationship between the to-be-located object and the positioning probe. The preset mapping relationship may be used to locate (e.g., determine) identification information for the first target object that has been uploaded by the positioning system.

In an example, location information for any person in a building may be collected by using an indoor positioning system, the positioning probe, and the positioning base station. Tracking information for any person may be automatically generated. Tracking image information for any person in the building may be generated by integrating the indoor positioning system and an image recognition system. A suspicious person may be marked in a surveillance image by integrating the indoor positioning system and the image recognition system. A back end server may automatically invoke tracking video images of the marked suspicious person. A front end surveillance device may use a smart camera having an infrared ranging function to calculate a depth of field of a surveillance image. This provides a technical effect of improving the accuracy of tracking for the suspicious person. After the suspicious person is marked in the surveillance image, a person recognition library may be established for the suspicious person to store physical feature recognition data of the suspicious target. Physical feature parameters of key frames in historical tracking events for a person may be matched with physical feature parameters of the suspicious target, to determine the identity of the suspicious object.

Embodiment 2

Figure 15:
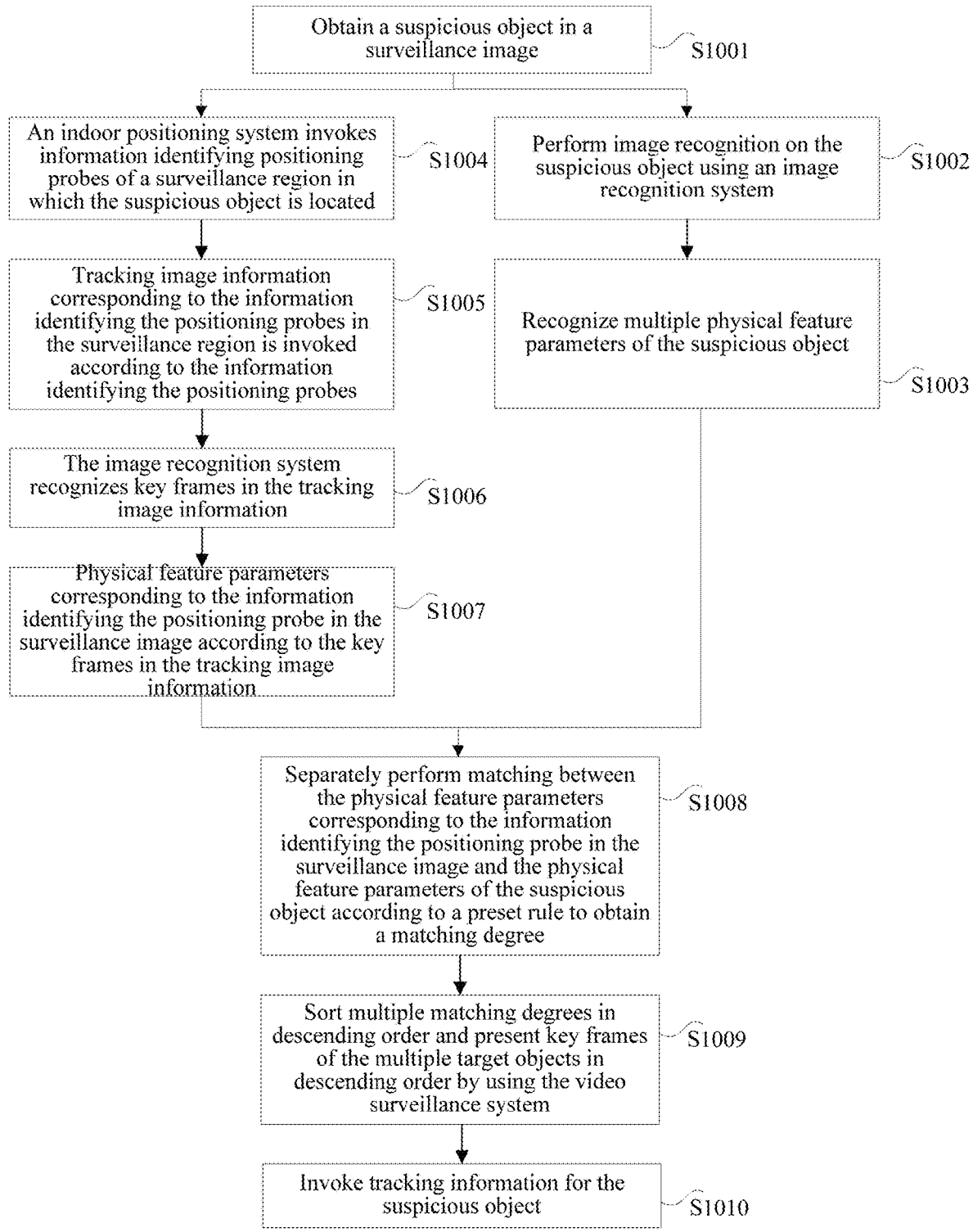
FIG. 15 is a flowchart of an eighth example tracking method for a video surveillance system.

FIG. 15 is a flowchart of a seventh example tracking method for a video surveillance system Step S901: A positioning system collects information about a positioning probe.

In a building architecture management system, persons coming into or out of a building may wear positioning probes. The positioning probe may be distributed to visitors in a form of a visitor card. Personal information for the visitor can be registered when the visitor card is distributed. For an employee in the building, the positioning probe may be embedded in a work card of the employee to track the employee.

The positioning system is deployed in the building. The positioning system may be several positioning base stations that are specially configured to collect the information about the positioning probe.

Step S902: The positioning system sends the information identifying the positioning probe, time information, and location information, when the positioning system uploads the information about the positioning probe to a server. The server may be a back end server.

Step S903: The server matches personal information in an information database according to the information identifying the positioning probe.

In the information database, the information identifying the positioning probe and the personal information are in a one-to-one correspondence. After receiving the information about the positioning probe, the server matches the personal information in the information database according to the information about the positioning probe.

Step S904: The server stores the personal information, the time information, and the location information in a preset database to obtain a storage result.

The server matches the personal information in the information database according to the information identifying the positioning probe. The server stores the information identifying the positioning probe, the uploaded location information, and the time information of the positioning system when the positioning system uploads the information about the positioning probe in the preset database to obtain the storage result.

Step S905: The server generates tracking information according to the storage result.

The server generates all tracking information of a target object in a building according to the storage result.

In an example, the information about the positioning probe is collected using the positioning system. The information identifying the positioning probe, the time information, and the location information of the positioning system are sent to the server using the positioning system. Personal information is then matched in the information database using the server based on the information identifying the positioning probe. The tracking information is generated using the server.

Figure 14:
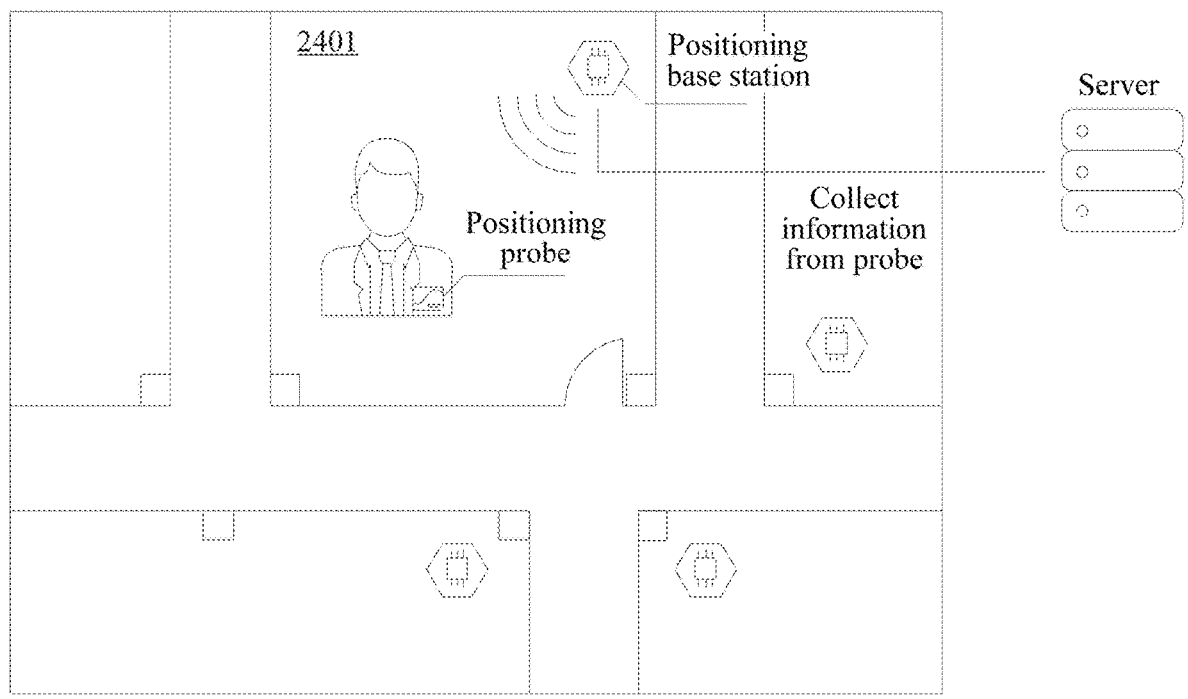
FIG. 14 is shows an example of video surveillance system tracking.

FIG. 14 shows an example of tracking for a video surveillance system. As shown in the example scenario of FIG. 14, a target object A carries a positioning probe. In the example scenario, the target object A has a meeting at 9 a.m. one day in a meeting room 2401. A corresponding base station in the meeting room 2401 collects information about a positioning probe of the target object A. The information about the positioning probe of the target object A is uploaded to a server. The server records that the target object A is in the meeting room 2401 at 9 a.m. using to the information about the positioning probe, time information, and location information. In a similar scenario, when the target object A walks in a building, an indoor positioning system continuously records real-time location information of the target object A, and integrates the location information of the target object A, to obtain tracking information of the target object A. For example, the system may generate tracking routes for the target object A.

After the tracking information is obtained, corresponding video images may be invoked in the video surveillance system according to the location information and the time information. In some cases, the video images are integrated to generate tracking image information of an object.

Figure 17:
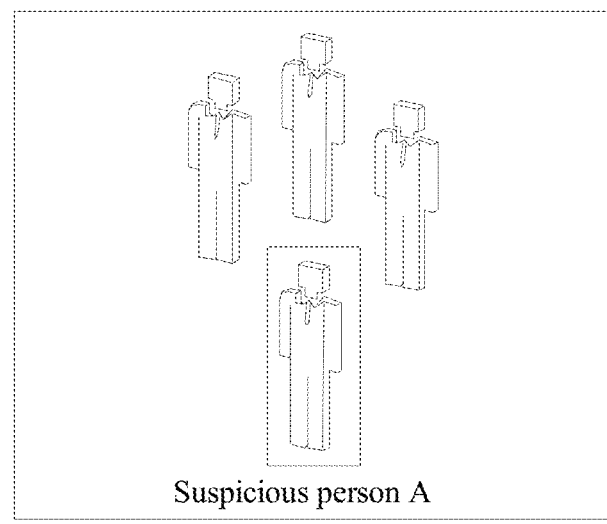
FIG. 17 shows an example of obtaining a second target object in a surveillance image according to the second example method of FIG. 6.

FIG. 17 is a flowchart of an eighth example tracking method for a video surveillance system.

Step S1001: Obtain a suspicious object in a surveillance image.

When watching surveillance footage, if surveillance personnel finds a suspicious object, the surveillance personnel may perform a marking operation on the suspicious object in a surveillance image. The suspicious object is a second target object. The marking operation may include circling the suspicious object in the surveillance image (e.g., using a human interface device), or otherwise highlighting the suspicious object within a mobile or terminal interface.

Step S1002: Perform image recognition on the suspicious object using an image recognition system.

After the surveillance image obtains the suspicious object, image recognition is performed on the marked suspicious object using an image recognition system. That is, image processing and analysis are performed on an image using a computer to recognize physical feature parameters of the suspicious object.

Step S1003: Recognize multiple physical feature parameters of the suspicious object.

Multiple physical feature parameters of the suspicious object are recognized. A feature recognition library is established for the suspicious object. The feature recognition library may include distinguishing features for the attributes of the suspicious object. For example, for a suspicious object A, when a server recognizes and analyzes an image, multiple physical feature recognition parameters may be analyzed. For example, a figure recognition parameter X, a clothing recognition parameter Y, a face recognition parameter Z, and/or other distinguishing features of the suspicious object A may be analyzed.

Step S1004: An indoor positioning system invokes information about all positioning probes of a surveillance region in which the suspicious object is located.

After the suspicious object is marked, the video surveillance system may interface with the indoor positioning system to record the information about positioning probes within the surveillance region in which suspicious object is located. For example, N target objects may be in the surveillance image, information for N positioning probes corresponding to those target objects may be collected.

Step S1005: Tracking image information corresponding to the positioning probes in the surveillance region is invoked.

The information about the positioning probe and the track image information are in a one-to-one correspondence. The track image information corresponding to the information about the positioning probe is pre-stored in a preset database. After the indoor positioning system invokes the identifying information for positioning probes in the surveillance region in which the suspicious object is located, tracking image information corresponding to the positioning probes in the surveillance region is invoked.

Step S1006: The image recognition system recognizes key frames in the tracking image information.

The key frames are used as defining frames that represent image content in the video surveillance system. The tracking image information includes the key frames. The key frames in the track image information are recognized using the image recognition system.

Step S1007: Physical feature parameters corresponding to the information for the positioning probe are identified within the key frames in the tracking image information.

After the key frames in the tracking image information are recognized using the image recognition system, the physical feature parameters recognized within the key frames.

Step S1008: Perform matching between the physical feature parameters corresponding to the information for the positioning probe and the physical feature parameters of the suspicious object according to a preset rule to obtain a matching degree.

Assuming that there are objects corresponding to N positioning probes in the surveillance image, matching is performed between physical feature parameters of the objects corresponding to the N positioning probes and the physical feature parameters of the suspicious object to obtain a matching degree. The matching degree may be obtained by calculating $M_{P1}=F(X_{P1}, X)+G(Y_{P1}, Y)+K(Z_{P1}, Z)$. $M_{P1}$ is a matching degree obtained by performing matching between physical feature parameters of an object corresponding to a first positioning probe and the physical feature parameters of the suspicious object. $X_{P1}$ is a figure recognition parameter, $Y_{P1}$ is a clothing recognition parameter, and $Z_{P1}$ is a face recognition parameter. The calculation may be repeated for each of the positioning probes.

Step S1009: Sort multiple matching degrees in descending order. Present key frames of the multiple target objects in descending order using the video surveillance system.

$M_{P1}$, $M_{P2}$, $M_{P3}$, ..., and $M_{PN}$ are sorted in descending order, Key frames including the corresponding object are presented one by one in descending order in a management interface in the video surveillance system. Surveillance personnel may review the presented data.

Step S1010: Invoke tracking information for the suspicious object.

After surveillance personnel further confirms a suspicious person, a back end server marks information for the suspicious person and records the information for the suspicious person. If the suspicious object is re-investigated at a future data, tracking image information for the suspicious object can be obtained from the back end server.

Tracking of the suspicious person may be performed using artificial intelligence. Accordingly, in some cases, input from surveillance personnel may be supplanted.

Figure 16:
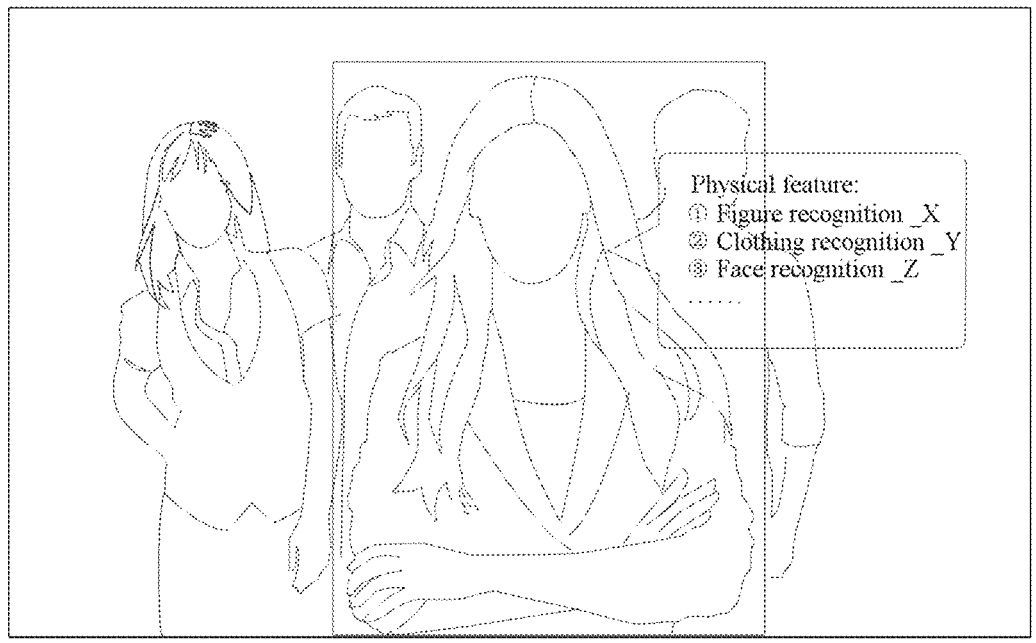
FIG. 16 shows an example of obtaining a second target object in a surveillance image according to the first example method of FIG. 5.
Figure 18:
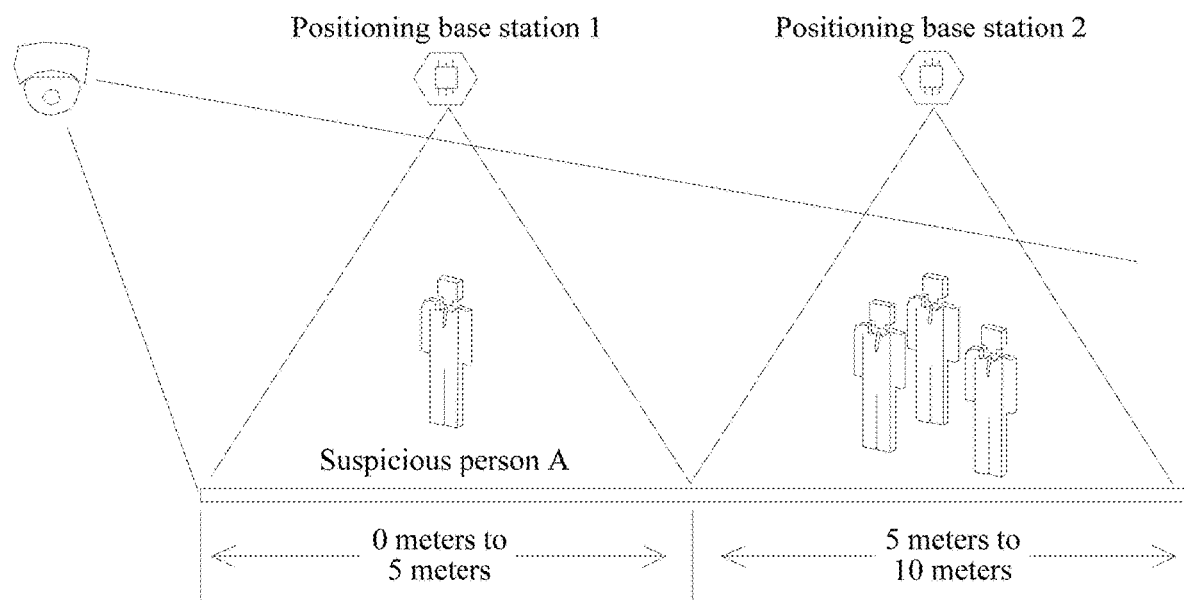
FIG. 18 is a schematic diagram of a positioning system for determining a surveillance region in which a second target object is located.

FIG. 16 is a schematic diagram of obtaining a second target object in a surveillance image according to the first example method of FIG. 5. As shown in FIG. 18, when watching surveillance footage, if a surveillance personnel finds the second target object, the surveillance person may mark the second target object in a surveillance image. For example, the input from the surveillance personnel may include drawing a block on the second target object so that the video surveillance system obtains the second target object. The second target object may be a suspicious object for a particular event. After the surveillance personnel marks the second target object, the video surveillance system interfaces with the indoor positioning system to record information identifying the positioning probes in the surveillance region in which the surveillance region marking the second target object is located. For example, if there are N persons in the surveillance image, and then there may be information for N positioning probes available.

In some cases, a server performs image recognition on the surveillance image, e.g., marking the second target object. A feature recognition library is established for the second target object marked in the surveillance image. The feature recognition library includes recognition parameters of attributes (features). For example, for the second target object, the server performs image recognition on the surveillance image of the second target object, and analyzes multiple physical features recognition parameters of the second target object. For example, physical feature parameters may include a figure recognition parameter X, a clothing recognition parameter Y, and/or a face recognition parameter Z.

FIG. 17 is a schematic diagram of obtaining a second target object in a surveillance image. In the example scenario illustrated in in FIG. 17, a surveillance region including the second target object is monitored using a QQ smart camera. Surveillance personnel marks the second target object in the surveillance image by placing a block around the second target object.

FIG. 18 is a schematic diagram of a positioning system for determining a surveillance region in which a second target object is located. In the example scenario illustrated in FIG. 18, surveillance personnel monitor the surveillance region including the second target object. A space region in which the second target object is located is calculated using a QQ smart camera according to a depth of field of the second target object. Therefore, a location at which a suspicious person A is located may be automatically recognized as a data collecting region of a positioning base station 1 using the QQ smart camera. The region in which the positioning base station 1 collects data is 0 meters to 5 meters, and the number of the first target objects that needs to match the second target object is reduced, thereby tracking the second target object more accurately. In this case, a back end server may match and recognize information about a positioning probe collected by the positioning base station 1 at a current time. Optionally, there is a positioning base station 2 in another indoor environment. The positioning base station 2 is neighboring to the positioning base station 1. A data collecting region of the positioning base station 2 is 5 meters to 10 meters.

For long-term employees or other individuals, identification of a mobile terminal device such as a mobile phone of the employee may be collected, and the mobile terminal of the employee is used as the positioning probe of the employee.

The foregoing example methods are represented as a series of actions, but the present disclosure is not limited to the described order of the actions because some steps may be performed in another order or performed simultaneously according to the present disclosure. In addition, any examples, implementations or embodiments described in this specification are included to illustrate relevant techniques and architectures, and the related actions and modules are not necessarily required in the present disclosure.

The foregoing description of the implementations demonstrate that the techniques and architectures described in the present disclosure may be implemented by software plus a hardware platform, and certainly may also be implemented by hardware. Based on such an understanding, the technical solutions of the present disclosure may be implemented in the form of a software product. The computer software product is stored in a storage medium, for example, a read-only memory (ROM)/a random access memory (RAM), a magnetic disk, or an optical disc, and contains several instructions for instructing a terminal device (which may be a mobile phone, a computer, a server, a network device, or the like) to perform the method.

Embodiment 3

An apparatus may be used for performing the foregoing example tracking method. The tracking apparatus for a video surveillance system may be configured to perform a tracking method for a video surveillance system.

Figure 19:
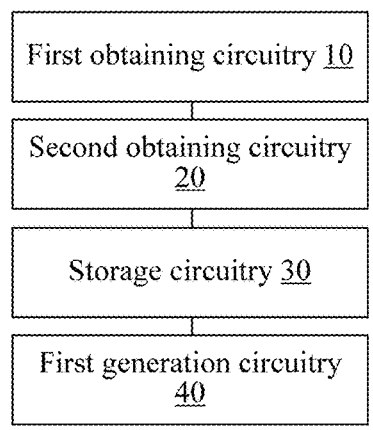
FIG. 19 is a schematic diagram of a tracking apparatus for a video surveillance system according to the first example method of FIG. 5.
Figure 21:
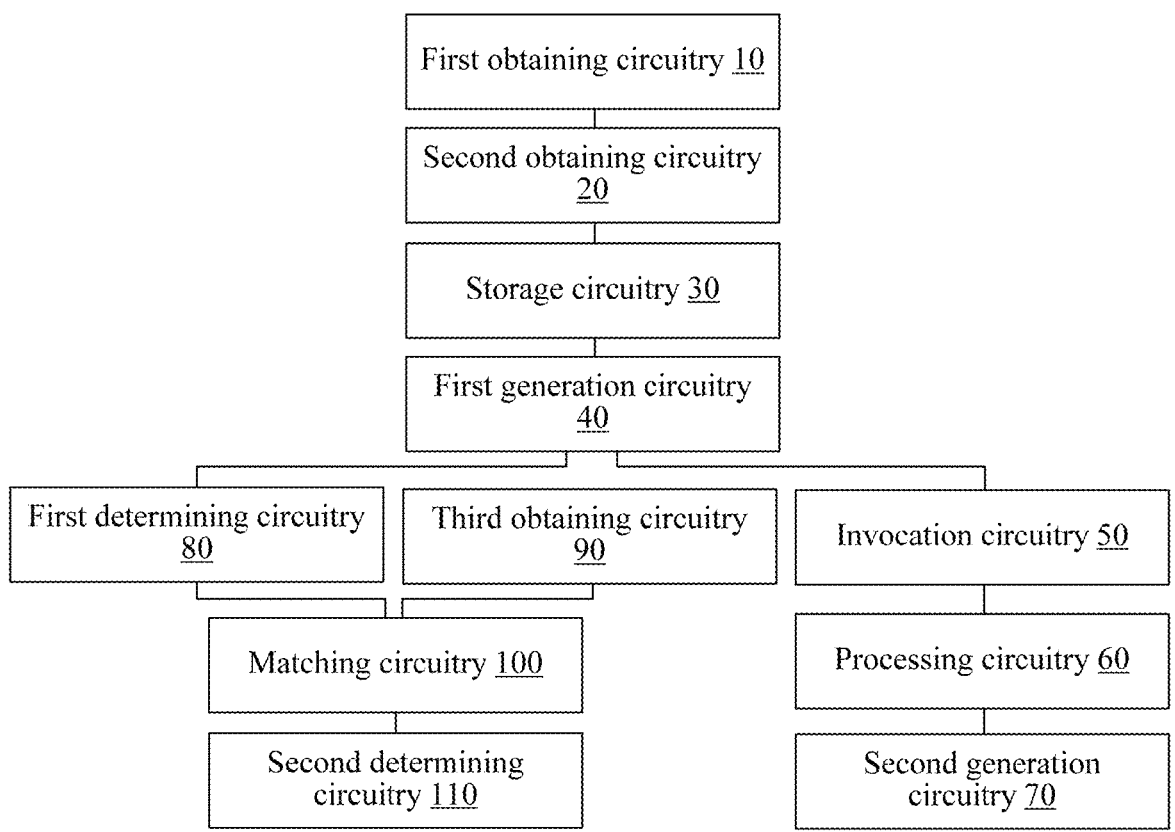
FIG. 21 is a schematic diagram of a tracking apparatus for a video surveillance system according to the third example method of FIG. 7.

FIG. 21 is a schematic diagram of a tracking apparatus for a video surveillance system according to the first example method of FIG. 5. As shown in FIG. 19, the tracking apparatus for a video surveillance system includes first obtaining circuitry 10, second obtaining circuitry 20, storage circuitry 30, and first generation circuitry 40.

The first obtaining circuitry 10 is configured to obtain identification information of a first target object uploaded by a positioning system. The positioning system and the first target object being located in an indoor environment. The positioning system being configured to locate the first target object in the indoor environment. The first target object being a to-be-tracked object.

The second obtaining circuitry 20 is configured to obtain time information and location information of the positioning system when the positioning system uploads the identification information.

The storage circuitry 30 is configured to store the identification information, the location information, and the time information in a preset database to obtain a storage result.

The first generation circuitry 40 is configured to generate tracking information of the first target object according to the storage result.

Optionally, the first generation circuitry 40 is configured to generate the tracking information of the first target object according to the storage result and a historical storage result. Before the storage result is obtained, the identification information of the first target object is uploaded by a positioning system in another indoor environment. The historical storage result is a result obtained by storing time information and location information of the positioning system in another indoor environment when the positioning system in another indoor environment uploads the identification information.

In the tracking apparatus for a video surveillance system, the first obtaining circuitry 10 may be configured to perform step S102. The second obtaining circuitry 20 may be configured to perform step S104. The storage circuitry 30 may be configured to perform step S106. The first generation circuitry 40 may be configured to perform step S108.

In some implementations, the identification information of the first target object uploaded by the positioning system is obtained using the first obtaining circuitry 10. The positioning system and the first target object are located in the indoor environment. The positioning system is configured to locate the first target object in the indoor environment, and the first target object is a to-be-tracked object. The time information and the location information of the positioning system when the positioning system uploads the identification information are obtained using the second obtaining circuitry 20. The identification information, the location information, and the time information are stored in the preset database using the storage circuitry 30 to obtain the storage result. The tracking information of the first target object is generated according to the storage result using the first generation circuitry 40.

In some implementations, the first obtaining circuitry 10, the second obtaining circuitry 20, the storage circuitry 30, and the first generation circuitry 40 may serve as a part of an apparatus running on a computer terminal. The terminal may execute a function implemented by the foregoing modules by using a processor in the computer terminal. The computer terminal may alternatively be a mobile device such as a smartphone (for example, an Android mobile phone or an iOS mobile phone), a tablet computer, a palmtop computer, a mobile Internet device (MID), or a PAD.

Figure 20:
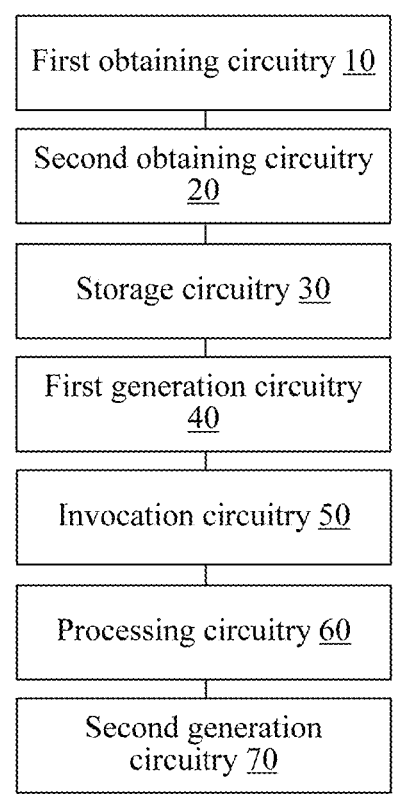
FIG. 20 is a schematic diagram of a tracking apparatus for a video surveillance system according to the second example method of FIG. 6.

FIG. 20 is a schematic diagram of a tracking apparatus for a video surveillance system according to the second example method of FIG. 6. As shown in FIG. 20, the tracking apparatus for a video surveillance system includes first obtaining circuitry 10, second obtaining circuitry 20, storage circuitry 30, and first generation circuitry 40. The tracking apparatus for a video surveillance system further includes an invocation circuitry 50, processing circuitry 60, and second generation circuitry 70.

The first obtaining circuitry 10, the second obtaining circuitry 20, the storage circuitry 30, and the first generation circuitry 40 operate as described above with regard to FIG. 19.

The invocation circuitry 50 is configured to: after tracking information of a first target object is generated according to a storage result, invoke, from a video surveillance system according to time information and location information, and video images of a surveillance region that correspond to the tracking information. The video surveillance system is configured to monitor a surveillance region in which the first target object is located to obtain the video images of the surveillance region.

The processing circuitry 60 is configured to integrate the video images of the surveillance region that correspond to the tracking information to obtain a processing result.

The second generation circuitry 70 is configured to generate track image information for the first target object according to the processing result.

The invocation circuitry 50, the processing circuitry 60, and the second generation circuitry 70 may serve as a part of an apparatus running on a computer terminal. The terminal may execute a function implemented by the foregoing modules by using a processor in the computer terminal. The computer terminal may alternatively be a mobile device such as a smartphone (for example, an Android mobile phone or an iOS mobile phone), a tablet computer, a palmtop computer, a mobile Internet device (MID), or a PAD.

FIG. 21 is a schematic diagram of a tracking apparatus for a video surveillance system according to the third example method of FIG. 7. As shown in FIG. 21, the tracking apparatus for a video surveillance system includes first obtaining circuitry 10, second obtaining circuitry 20, storage circuitry 30, first generation circuitry 40, invocation circuitry 50, processing circuitry 60, and second generation circuitry 70. The tracking apparatus for a video surveillance system further includes first determining circuitry 80, third obtaining circuitry 90, matching circuitry 100, and second determining circuitry 110.

The first obtaining circuitry 10, the second obtaining circuitry 20, the storage circuitry 30, the first generation circuitry 40, the invocation circuitry 50, the processing circuitry 60, and the second generation circuitry 70 operate as described above with regard to FIGS. 19 and 20.

A first target object includes multiple first target objects located in a surveillance region. A preset database stores track image information of the multiple first target objects.

The first determining circuitry 80 is configured to: after tracking information of the first target object is generated according to a storage result, determine a second target object in the multiple first target objects, where the second target object is an object that is marked using a preset symbol.

The third obtaining circuitry 90 is configured to obtain physical feature parameters of the multiple first target objects.

The matching circuitry 100 is configured to perform matching between the physical feature parameters of the multiple first target objects and physical feature parameters of the second target object according to a preset rule to obtain a matching result.

The second determining circuitry 110 is configured to determine track image information for the second target object in the track image information of the multiple first target objects according to the matching result.

It should be noted herein that, the first determining circuitry 80, the third obtaining circuitry 90, the matching circuitry 100, and the second determining circuitry 110 may serve as a part of an apparatus running on a computer terminal. The terminal may execute a function implemented by the foregoing modules by using a processor in the computer terminal. The computer terminal may alternatively be a mobile device such as a smartphone (for example, an Android mobile phone or an iOS mobile phone), a tablet computer, a palmtop computer, a mobile Internet device (MID), or a PAD.

Figure 22:
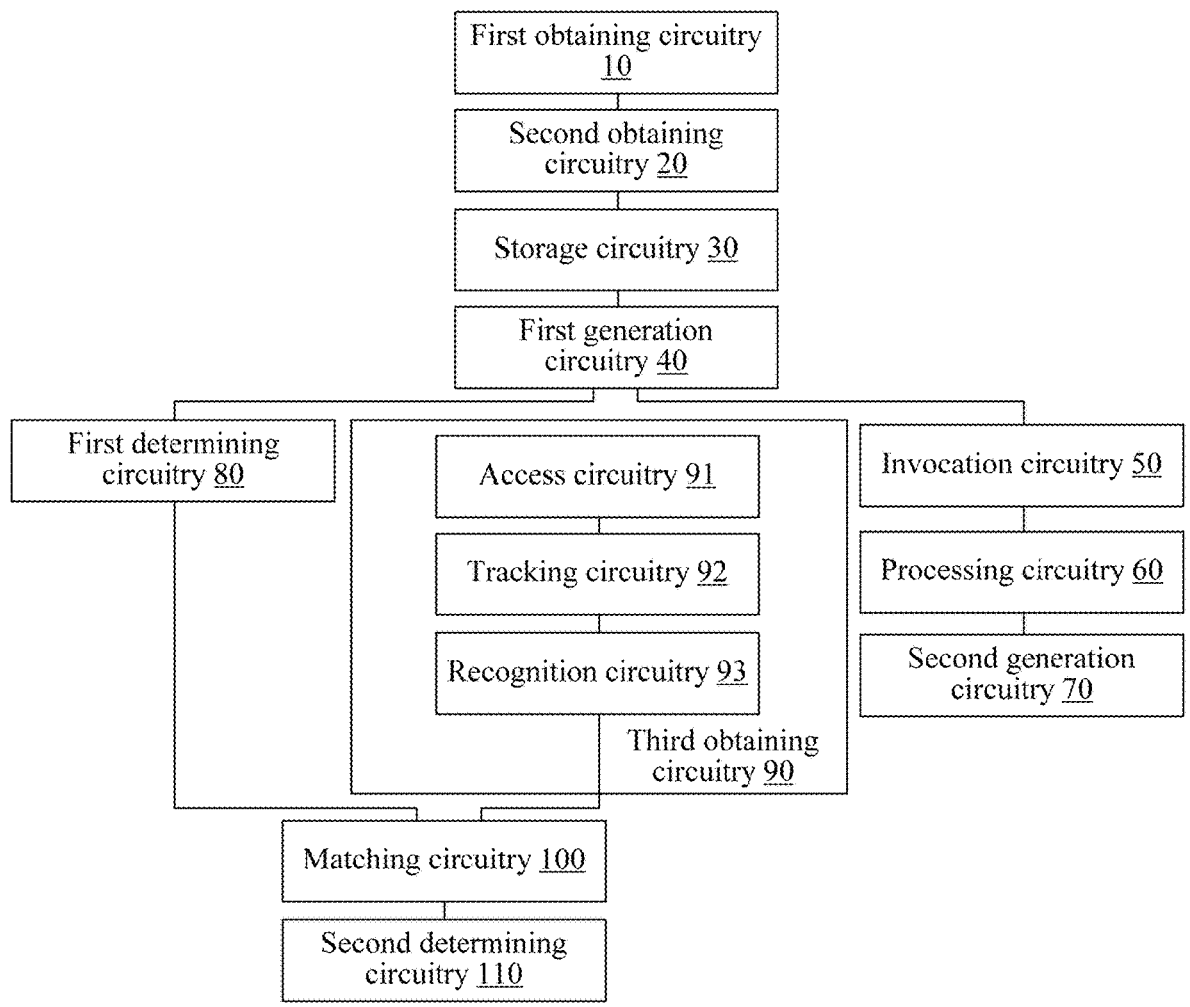
FIG. 22 is a schematic diagram of a tracking apparatus for a video surveillance system according to the fourth example method of FIG. 9.

FIG. 22 is a schematic diagram of a tracking obtaining apparatus for a video surveillance system according to the fourth example method of FIG. 9. As shown in FIG. 22, the tracking apparatus for a video surveillance system includes first obtaining circuitry 10, second obtaining circuitry 20, storage circuitry 30, first generation circuitry 40, invocation circuitry 50, processing circuitry 60, second generation circuitry 70, first determining circuitry 80, third obtaining circuitry 90, matching circuitry 100, and second determining circuitry 110. The third obtaining circuitry 90 includes access circuitry 91, tracking circuitry 92, and recognition circuitry 93.

The first obtaining circuitry 10, the second obtaining circuitry 20, the storage circuitry 30, the first generation circuitry 40, the invocation circuitry 50, the processing circuitry 60, the second generation circuitry 70, the first determining circuitry 80, the third obtaining circuitry 90, the matching circuitry 100, and the second determining circuitry 110 operate as described above with regard to FIGS. 19, 20, and 21.

The access circuitry 91 is configured to obtain identification information of multiple first target objects.

The tracking circuitry 92 is configured to invoke track image information of the multiple first target objects according to the identification information of the multiple first target objects.

The recognition circuitry 93 is configured to: perform image recognition on key frames in the track image information of the multiple first target objects by using an image recognition system; to obtain physical feature parameters of the multiple first target objects; and separately store the physical feature parameters of the multiple first target objects in a feature recognition library. The feature recognition library is used for storing physical feature data of the multiple first target objects.

The access circuitry 91, the tracking circuitry 92, and the recognition circuitry 93 may serve as a part of an apparatus running on a computer terminal. The terminal may execute a function implemented by the foregoing modules by using a processor in the computer terminal. The computer terminal may alternatively be a mobile device such as a smartphone (for example, an Android mobile phone or an iOS mobile phone), a tablet computer, a palmtop computer, a mobile Internet device (MID), or a PAD.

Figure 23:
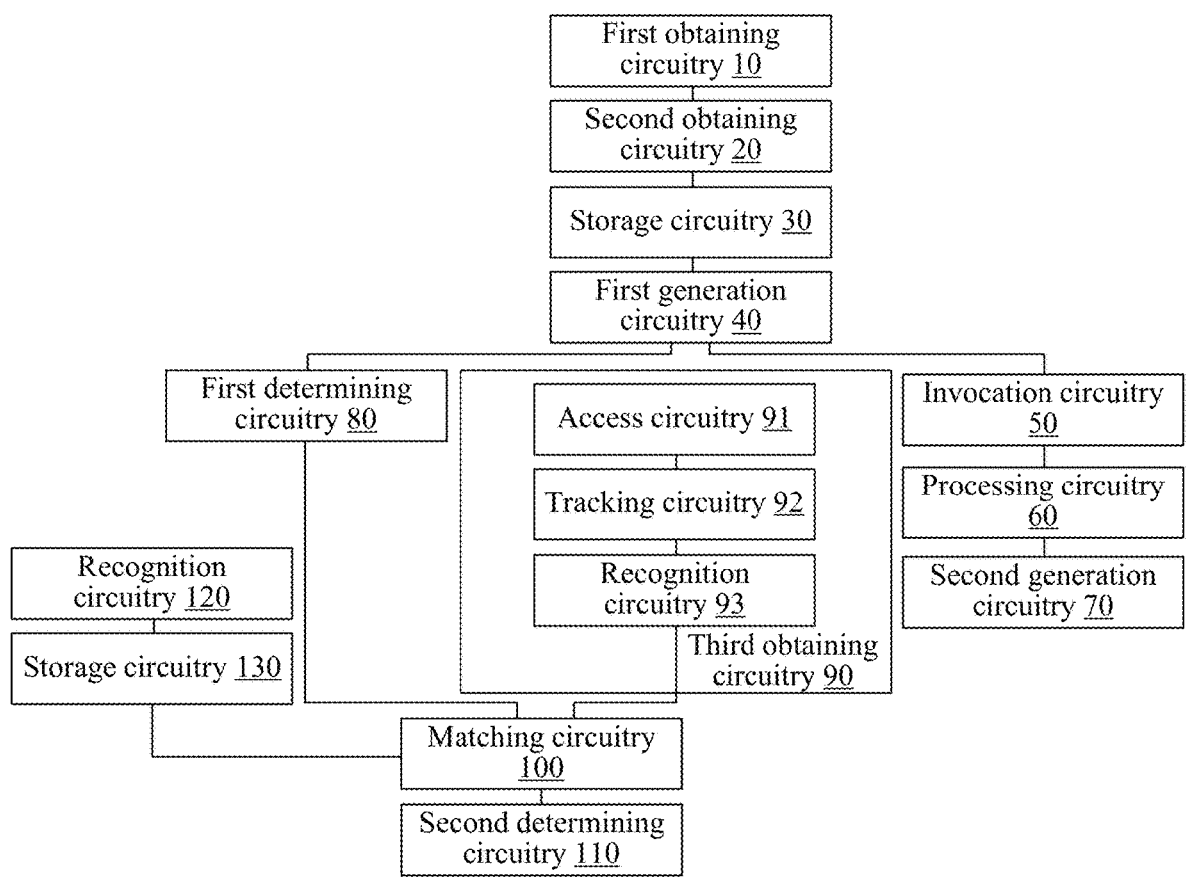
FIG. 23 is a schematic diagram of a tracking apparatus for a video surveillance system according to the fifth example method of FIG. 11.

FIG. 23 is a schematic diagram of a tracking apparatus for a video surveillance system according to the fifth example method of FIG. 11. As shown in FIG. 23, the tracking apparatus for a video surveillance system includes a first obtaining circuitry 10, a second obtaining circuitry 20, a storage circuitry 30, a first generation circuitry 40, an invocation circuitry 50, a processing circuitry 60, and a second generation circuitry 70, a first determining circuitry 80, a third obtaining circuitry 90, a matching circuitry 100, and a second determining circuitry 110. The third obtaining circuitry 90 includes access circuitry 91, tracking circuitry 92, and recognition circuitry 93. The tracking apparatus for a video surveillance system further includes recognition circuitry 120 and a storage circuitry 130.

The recognition circuitry 120 is configured to: before matching is performed between physical feature parameters of multiple first target objects and physical feature parameters of a second target object, perform image recognition on the second target object by using an image recognition system to obtain the physical feature parameters of the second target object.

The storage circuitry 130 is configured to store the physical feature parameters of the second target object in a feature recognition library.

The recognition circuitry 120 and the storage circuitry 130 may serve as a part of an apparatus running on a computer terminal. The terminal may execute a function implemented by the foregoing modules by using a processor in the computer terminal. The computer terminal may alternatively be a mobile device such as a smartphone (for example, an Android mobile phone or an iOS mobile phone), a tablet computer, a palmtop computer, a mobile Internet device (MID), or a PAD.

Figure 24:
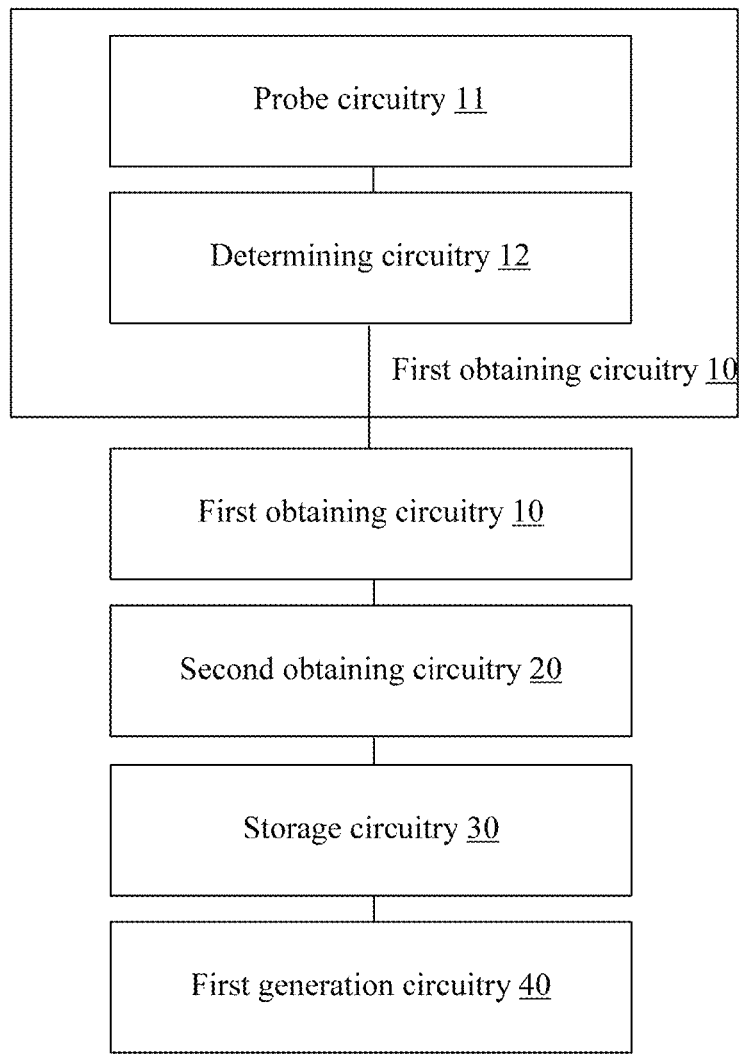
FIG. 24 is a schematic diagram of a tracking apparatus for a video surveillance system according to the sixth example method of FIG. 12.
Figure 25:
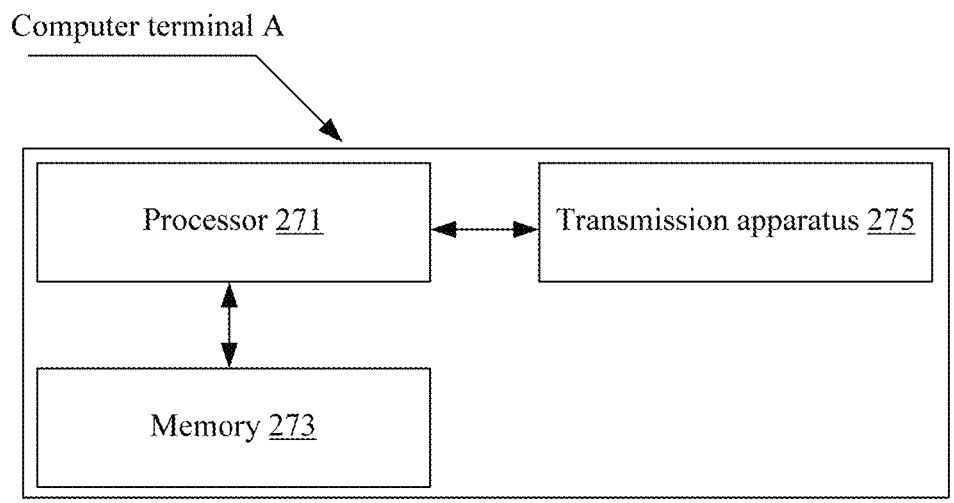
FIG. 25 is a structural block diagram of a computer terminal for execution of video surveillance tracking.

FIG. 24 is a schematic diagram of a tracking apparatus for a video surveillance system according to the sixth example method of FIG. 12. As shown in FIG. 24, the tracking apparatus for a video surveillance system includes a first obtaining circuitry 10, a second obtaining circuitry 20, a storage circuitry 30, and a first generation circuitry 40. The first obtaining circuitry 10 includes probe circuitry 11 and determining circuitry 12.

The probe circuitry 11 is configured to obtain information identifying a positioning probe disposed on a first target object, where the positioning probe is used for marking the first target object.

The determining module 12 is configured to determine information particular to the first target object by referencing an information database using the information identifying the positioning probe. The information about the positioning probe and the personal information of the first target object are in a one-to-one correspondence.

The probe circuitry 11 and the determining module 12 may serve as a part of an apparatus running on a computer terminal. The terminal may execute a function implemented by the foregoing modules by using a processor in the computer terminal. The computer terminal may alternatively be a mobile device such as a smartphone (for example, an Android mobile phone or an iOS mobile phone), a tablet computer, a palmtop computer, a mobile Internet device (MID), or a PAD.

The above-described circuitry be implemented as a mobile terminal, a computer terminal, or a similar operation apparatus running instructions on a storage medium.

Optionally, the foregoing computer terminal may be located in at least one of multiple network devices in a computer network.

Embodiment 4

Optionally, a storage medium may store program code. The medium may be other than a transitory signal. In some cases, the medium may include a non-transitory storage medium. The program code is used for performing steps in the example tracking methods for a video surveillance system described above.

Optionally, the storage medium may be located in any computer terminal in a computer terminal group in a computer network, or may be located in any mobile terminal in a mobile terminal group.

Optionally, in this embodiment, the storage medium is configured to store program code used for executing the following steps:

obtaining identification information of a first target object uploaded by a positioning system, the positioning system and the first target object being located in an indoor environment, the positioning system being configured to locate the first target object in the indoor environment, and the first target object being a to-be-tracked object;

obtaining time information and location information of the positioning system when the positioning system uploads the identification information;

storing the identification information, the location information, and the time information in a preset database, to obtain a storage result; and generating tracking information of the first target object according to the storage result.

Optionally, the storage medium is further configured to store program code used for executing the following steps: after the tracking information of the first target object is generated according to the storage result, invoking, from a video surveillance system according to the time information and the location information, video images of a surveillance region that correspond to tracking information, where the video surveillance system is configured to monitor a surveillance region in which the first target object is located, to obtain the video images of the surveillance region; and generating track image information of the first target object according to the processing result.

Optionally, the storage medium is further configured to store program code used for executing the following steps: determining a second target object in multiple first target objects, where the second target object is marked using a preset symbol; obtaining physical feature parameters of the multiple first target objects; performing matching between physical feature parameters of the multiple first target objects and physical feature parameters of the second target object according to a preset rule to obtain a matching result; and determining tracking image information of the second target object in the tracking image information of the multiple first target objects according to the matching result.

Optionally, the storage medium is further configured to store program code used for executing the following steps: obtaining identification information of the multiple first target objects; invoking the tracking image information of the multiple first target objects according to the identification information of the multiple first target objects; performing image recognition on key frames in the tracking image information of the multiple first target objects by using an image recognition system, to obtain the physical feature parameters of the multiple first target objects, and separately storing the physical feature parameters of the multiple first target objects in a feature recognition library, where the feature recognition library is used for storing physical feature data of the multiple first target objects.

Optionally, the storage medium is further configured to store program code used for executing the following steps: obtaining identification information of the multiple first target objects; invoking the tracking image information of the multiple first target objects according to the identification information of the multiple first target objects; performing image recognition on key frames in the tracking image information of the multiple first target objects by using an image recognition system, to obtain the physical feature parameters of the multiple first target objects, and separately storing the physical feature parameters of the multiple first target objects in a feature recognition library, where the feature recognition library is used for storing physical feature data of the multiple first target objects.

Optionally, the storage medium is further configured to store program code used for executing the following steps: performing matching between the physical feature parameters of the multiple first target objects and the physical feature parameters of the second target object according to the preset rule, to obtain multiple matching degrees; sorting the multiple matching degrees in a preset order, and presenting the key frames of the multiple first target objects in the preset order by using the video surveillance system, where the determining tracking image information of the second target object in the track image information of the multiple first target objects according to the matching result includes: determining tracking image information of a first target object whose matching degree with the second target object is the highest as the track image information of the second target object.

Optionally, the storage medium is further configured to store program code used for executing the following steps: performing matching between the physical feature parameters of the multiple first target objects and the physical feature parameters of the second target object according to the preset rule to obtain multiple matching degrees; sorting the multiple matching degrees in a preset order, and presenting the key frames of the multiple first target objects in the preset order by using the video surveillance system, where the determining tracking image information of the second target object in the tracking image information of the multiple first target objects according to the matching result includes: determining tracking image information of a first target object whose matching degree with the second target object is the highest as the tracking image information of the second target object.

Optionally, the storage medium is further configured to store program code used for executing the following steps: calculating a depth of field of the surveillance image by using a smart camera having an infrared ranging function; and determining the surveillance region according to the depth of field of the surveillance image by using the smart camera.

Optionally, the storage medium is further configured to store program code used for executing the following steps: obtaining information about a positioning probe disposed on the first target object, to obtain the information about the positioning probe, where the positioning probe is used for marking the target object; and determining personal information of the first target object in an information database according to the information about the positioning probe, where the information about the positioning probe and the personal information of the first target object are in a one-to-one correspondence.

Optionally, in this embodiment, the foregoing storage medium may include, but is not limited to: any medium that can store program code, such as a USB flash drive, a ROM, a RAM, a removable hard disk, a magnetic disk, or an optical disc.

The above describes the message sending method and apparatus according to the present disclosure with reference to the accompanying drawings by using examples. However, various changes may be made to the tracking method and apparatus provided by the present disclosure without departing from content of the present disclosure.

Embodiment 5

Optionally, in various implementations computer terminal and/or mobile device may be located in at least one of multiple network devices in a computer network.

Optionally, FIG. 27 is a structural block diagram of a computer terminal for execution of video surveillance tracking. As shown in FIG. 27, the computer terminal A may include: one or more (only one is shown in the figure) processors 271, a memory 273, and a transmission apparatus 275.

The memory 273 may be configured to store a software program and a module, for example, a program instruction/module corresponding to the one or more of the example tracking methods for a video surveillance system described above. The processor 271 executes various function applications and data processing by running the software program and the module stored in the memory 273. For example, a tracking method for a video surveillance system may be implemented. The memory 273 may include a high-speed random memory, and may also include a nonvolatile memory such as one or more magnetic storage devices, a flash memory, or another nonvolatile solid-state memory. In some examples, the memory 273 may further include a memory that is remotely disposed relative to the processor 271, and the remote memory may be connected to the computer terminal A through a network. Examples of the network include, but are not limited to, the Internet, an intranet, a local area network, a mobile communications network, or a combination thereof.

The foregoing transmission apparatus 275 is configured to receive or send data through a network. Specific examples of the foregoing network may include a wired network and a wireless network. In an example, the transmission apparatus 275 includes a network interface controller NIC that may be connected to another network device and a router by using a network cable, thereby communicating with the Internet or a local area network. In an example, the transmission apparatus 275 is an RF module that is configured to communicate with the Internet in a wirelessly.

Specifically, the memory 273 is configured to store information about a preset action condition, a preset privileged user, and an application.

The processor 271 may invoke the information and the application stored in the memory 273 using the transmission apparatus 275 to execute program code of one or more of the example methods described above. For example the operation may include:

obtaining identification information of a first target object uploaded by a positioning system, the positioning system and the first target object being located in an indoor environment, the positioning system being configured to locate the first target object in the indoor environment, and the first target object being a to-be-tracked object;

obtaining time information and location information of the positioning system when the positioning system uploads the identification information;

storing the identification information, the location information, and the time information in a preset database to obtain a storage result; and generating tracking information of the first target object according to the storage result.

Optionally, implementing one or more features of the example methods described above.

The sequence numbers of the preceding example methods for description purpose but do not indicate the any ranking or other order.

AThe computer terminal may alternatively be a terminal device such as a smartphone (such as an Android mobile phone or an iOS mobile phone), a tablet computer, a palmtop computer, an MID, or a PAD.

All or a part of any or all of the of the foregoing example methods may be implemented by a program instructing related hardware of the terminal device. The program may be stored in a computer readable storage medium. The storage medium may be a flash disk, a ROM, a RAM, a magnetic disk, an optical disc, or other storage device.

When integrated circuitry in any of the foregoing systems is implemented using a form of a software functional module and sold or used as an independent product, the integrated circuitry may include the foregoing computer-readable storage medium. Based on such an understanding, the technical solutions of the present disclosure essentially, or the part contributing to the existing technology, or all or some of the technical solutions may be implemented at least in part in the form of a software product. The computer software product is stored in a storage medium and includes several instructions for instructing one or more machine (which may be a personal computer, mobile device, a server, or a network device, or other computational device) to perform all or some of the example methods described above.

The disclosed apparatus may be implemented in other manners. For example, the circuitry division is merely logical function division and other divisions may be present in an implementation. For example, multiple circuits or components may be combined or integrated into another system, or some features may be ignored or not performed.

The circuitry described as separate parts may or may not be physically separate, and parts displayed as units, may be located in one position, or may be distributed on multiple networked circuits.

In addition, functional circuitry may be integrated into one processing unit, or each of the units may exist alone physically, or two or more type of function circuitry are integrated into one unit. The integrated unit may be implemented in a form of hardware, or may be implemented in a form of a software functional unit running on circuitry.

The foregoing descriptions are example implementations. Other implementations are possible.

What is claimed is:

1. A tracking method for a video surveillance system including a terminal having a processor and a storage medium having a program stored therein, the method comprising:
    obtaining, by the terminal, identification information of a first target object comprising multiple first target objects uploaded by a positioning system, the positioning system and the multiple first target objects being located in an indoor environment, the positioning system being configured to locate the multiple first target objects in the indoor environment, and the multiple first target objects being to-be-tracked objects;
    obtaining, by the terminal, time information and location information for the positioning system at a time the positioning system uploads the identification information;
    storing, by the terminal, the identification information, the location information, and the time information in a memory to obtain a storage result;
    generating, by the terminal, tracking information for the first target object according to the storage result;
    obtaining, by the terminal, a surveillance image from the video surveillance system;
    calculating, by the terminal, a depth of field of the surveillance image by calculating the depth of field of the surveillance image using a smart camera having an infrared ranging function;
    determining, by the terminal, a surveillance region including the multiple first objects that are then matched with a second target object using the calculated depth of field of the surveillance image;
    determining, by the terminal, the multiple first target objects in the surveillance region;
    invoking, by the terminal, from the video surveillance system according to the time information and the location information, video images of the surveillance region that correspond to the tracking information, wherein the video surveillance system is configured to monitor the surveillance region in which the multiple first target objects are located to obtain the video images of the surveillance region;
    integrating, by the terminal, the video images of the surveillance region that correspond to the tracking information to obtain a processing result;
    generating, by the terminal, tracking image information for the multiple first target objects according to the processing result;
    determining, by the terminal, the second target object from among the multiple first target objects;
    obtaining, by the terminal, physical feature parameters of the multiple first target objects;
    performing, by the terminal, matching between the physical feature parameters of the multiple first target objects and physical feature parameters of the second target object according to a preset rule to obtain a matching result by:
        performing, by the terminal, matching between the physical feature parameters of the multiple first target objects and the physical feature parameters of the second target object according to the preset rule to obtain multiple matching degrees; and
        sorting, by the terminal, the multiple matching degrees in a preset order, and executing playback of the key frames of the multiple first target objects in the preset order using the video surveillance system;
    determining, by the terminal, tracking image information for the second target object in the tracking image information of the multiple first target objects according to the matching result by:
        determining, by the terminal, matching tracking image information of a first target object whose matching degree with the second target object is highest; and
        applying, by the terminal, the matching tracking image information as the tracking image information of the second target object; and
    displaying, on a screen of the terminal, the tracking image information for the second target object.

2. The method according to claim 1, wherein the obtaining physical feature parameters of the multiple first target objects comprises:
    obtaining, by the terminal, identification information for the multiple first target objects;
    invoking, by the terminal, the tracking image information for the multiple first target objects according to the identification information for the multiple first target objects;
    performing, by the terminal, image recognition on key frames in the tracking image information using an image recognition system to obtain the physical feature parameters of the multiple first target objects; and
    storing, by the terminal, the physical feature parameters of the multiple first target objects in a feature recognition library, wherein the feature recognition library is used for storing physical feature data for the multiple first target objects.

3. The method according to claim 2, wherein the method further comprises:
before the performing matching between the physical feature parameters of the multiple first target objects and physical feature parameters of the second target object:
performing, by the terminal, image recognition on the second target object by using the image recognition system to obtain the physical feature parameters of the second target object; and
storing, by the terminal, the physical feature parameters of the second target object in the feature recognition library.

4. The method according to claim 1, wherein:
determining, by the terminal, the surveillance region according to the depth of field of the surveillance image comprises: determining the surveillance region according to the depth of field of the surveillance image using the smart camera.

5. The method according to claim 1, wherein the first target object comprises a positioning probe, and the positioning system comprises a positioning base station disposed in the indoor environment.

6. The method according to claim 5, wherein the method further comprises:
after obtaining identification information of a first target object uploaded by a positioning system:
obtaining, by the terminal, a preset mapping relationship between a to-be-located object and the positioning probe, wherein the positioning probe is disposed on the to-be-located object, and the positioning probe is used to mark the first target object; and
determining the memory according to information identifying the positioning probe and the preset mapping relationship.

7. A tracking apparatus for a video surveillance system, comprising:
a memory storing program instructions; and
a processor configured to execute the program instructions, and when executing the program instructions, is configured to:
obtain identification information for a first target object uploaded by a positioning system, the positioning system and the first target object being located in an indoor environment, the positioning system being configured to locate the first target object in the indoor environment, and the first target object being a to-be-tracked object;
obtain time information and location information of the positioning system at a time the positioning system uploads the identification information;
store the identification information, the location information, and the time information in the memory to obtain a storage result;
generate tracking information of the first target object according to the storage result;
obtain a surveillance image from the video surveillance system;
calculate a depth of field of the surveillance image by calculating the depth of field of the surveillance image using a smart camera having an infrared ranging function;
determine a surveillance region including the multiple first objects that are then matched with a second target object using the calculated depth of field of the surveillance image;
determine the multiple first target objects in the surveillance region;
invoke, from the video surveillance system according to the time information and the location information, video images of the surveillance region that correspond to the tracking information, wherein the video surveillance system is configured to monitor the surveillance region in which the multiple first target objects are located to obtain the video images of the surveillance region;
integrate the video images of the surveillance region that correspond to the tracking information to obtain a processing result;
generate tracking image information for the multiple first target objects according to the processing result;
determine the second target object from among the multiple first target objects;
obtain physical feature parameters of the multiple first target objects;
perform matching between the physical feature parameters of the multiple first target objects and physical feature parameters of the second target object according to a preset rule to obtain a matching result by:
performing, by the terminal, matching between the physical feature parameters of the multiple first target objects and the physical feature parameters of the second target object according to the preset rule to obtain multiple matching degrees; and
sorting, by the terminal, the multiple matching degrees in a preset order, and executing playback of the key frames of the multiple first target objects in the preset order using the video surveillance system;
determine tracking image information for the second target object in the tracking image information of the multiple first target objects according to the matching result by:
determining, by the terminal, matching tracking image information of a first target object whose matching degree with the second target object is highest; and
applying, by the terminal, the matching tracking image information as the tracking image information of the second target object; and
display, on a screen, the tracking image information for the second target object.

8. The apparatus according to claim 7, wherein the processor, when executing the program instructions, is further configured to:
obtain identification information of the multiple first target objects;
invoke the tracking image information of the multiple first target objects according to the identification information of the multiple first target objects;
perform image recognition on key frames in the track image information of the multiple first target objects by using an image recognition system to obtain the physical feature parameters of the multiple first target objects; and
store the physical feature parameters of the multiple first target objects in a feature recognition library, wherein the feature recognition library is used for storing physical feature data of the multiple first target objects.

9. The apparatus according to claim 8, wherein the processor, when executing the program instructions, is further configured to:
- before performing matching between the physical feature parameters of the multiple first target objects and physical feature parameters of the second target object, perform image recognition on the second target object by using the image recognition system, to obtain the physical feature parameters of the second target object; and
- store the physical feature parameters of the second target object in the feature recognition library.

10. The apparatus according to claim 7, wherein the processor, when executing the program instructions, is further configured to:
- obtain information identifying a positioning probe disposed on the first target object, wherein the positioning probe is used for marking the first target object; and
- determine personal information of the first target object in the memory according to the information identifying the positioning probe, wherein the information identifying the positioning probe and the personal information of the first target object are in a one-to-one correspondence.

11. Non-transitory machine readable storage media, comprising a machine readable program stored thereon, the machine readable program configured to, when executed, cause a machine to implement a tracking method comprising:
- obtaining identification information of a first target object uploaded by a positioning system, the positioning system and the first target object being located in an indoor environment, the positioning system being configured to locate the first target object in the indoor environment, and the first target object being a to-be-tracked object;
- obtaining time information and location information for the positioning system at a time the positioning system uploads the identification information;
- storing the identification information, the location information, and the time information in a memory to obtain a storage result;
- generating tracking information for the first target object according to the storage result;
- obtaining a surveillance image from the video surveillance system;
- calculating a depth of field of the surveillance image by calculating the depth of field of the surveillance image using a smart camera having an infrared ranging function;
- determining a surveillance region including the multiple first objects that are then matched with a second target object using the calculated depth of field of the surveillance image;
- determining the multiple first objects in the surveillance region;
- invoking from the video surveillance system according to the time information and the location information, video images of the surveillance region that correspond to the tracking information, wherein the video surveillance system is configured to monitor the surveillance region in which the multiple first target objects are located to obtain the video images of the surveillance region;
- integrating the video images of the surveillance region that correspond to the tracking information to obtain a processing result;
- generating tracking image information for the multiple first target objects according to the processing result;
- determining the second target object from among the multiple first target objects;
- obtaining physical feature parameters of the multiple first target objects;
- performing matching between the physical feature parameters of the multiple first target objects and physical feature parameters of the second target object according to a preset rule to obtain a matching result by:
  - performing, by the terminal, matching between the physical feature parameters of the multiple first target objects and the physical feature parameters of the second target object according to the preset rule to obtain multiple matching degrees; and
  - sorting, by the terminal, the multiple matching degrees in a preset order, and executing playback of the key frames of the multiple first target objects in the preset order using the video surveillance system;
- determining tracking image information for the second target object in the tracking image information of the multiple first target objects according to the matching result by:
  - determining, by the terminal, matching tracking image information of a first target object whose matching degree with the second target object is highest and
  - applying, by the terminal, the matching tracking image information as the tracking image information of the second target object; and
- displaying, on a screen, the tracking image information for the second target object.

* * * * *